(12) United States Patent
Kawanishi et al.

(10) Patent No.: US 9,008,438 B2
(45) Date of Patent: Apr. 14, 2015

(54) IMAGE PROCESSING DEVICE THAT ASSOCIATES PHOTOGRAPHED IMAGES THAT CONTAIN A SPECIFIED OBJECT WITH THE SPECIFIED OBJECT

(75) Inventors: Ryouichi Kawanishi, Kyoto (JP); Tsutomu Uenoyama, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 283 days.

(21) Appl. No.: 13/805,153

(22) PCT Filed: Feb. 29, 2012

(86) PCT No.: PCT/JP2012/001392
§ 371 (c)(1), (2), (4) Date: Dec. 18, 2012

(87) PCT Pub. No.: WO2012/147256
PCT Pub. Date: Nov. 1, 2012

(65) Prior Publication Data
US 2013/0101223 A1    Apr. 25, 2013

(30) Foreign Application Priority Data
Apr. 25, 2011  (JP) ................................. 2011-097669

(51) Int. Cl.
*G06K 9/62* (2006.01)
*G06K 9/46* (2006.01)
(Continued)

(52) U.S. Cl.
CPC .. *G06K 9/46* (2013.01); *H04N 5/91* (2013.01); *H04N 9/8205* (2013.01); *H04N 5/765* (2013.01);
(Continued)

(58) Field of Classification Search
None
See application file for complete search history.

(56) References Cited

U.S. PATENT DOCUMENTS 8,655,893 B2 *  2/2014  Wang et al. ................... 707/752
2002/0168108 A1  11/2002  Loui et al.
(Continued)

FOREIGN PATENT DOCUMENTS

JP    2002-10178    1/2002
JP    2003-16448    1/2003
(Continued)

OTHER PUBLICATIONS

Myron Flickner et al., "Query by Image and Video Content: The QBIC System", IEEE Computer, Sep. 1995, pp. 23-32.*
(Continued)

*Primary Examiner* — Brian P Werner
(74) *Attorney, Agent, or Firm* — Wenderoth, Lind & Ponack, L.L.P.

(57) ABSTRACT

Provided is an image processing device for associating images with objects appearing in the images, while reducing burden on the user. The image processing device: stores, for each of events, a photographic attribute indicating a photographic condition predicted to be met with respect to an image photographed in the event; stores an object predicted to appear in an image photographed in the event; extracts from a collection of photographed images a photographic attribute that is common among a predetermined number of photographed images in the collection, based on pieces of photography-related information of the respective photographed images; specifies an object stored for an event corresponding to the extracted photographic attribute; and conducts a process on the collection of photographed images to associate each photographed image containing the specified object with the object.

23 Claims, 32 Drawing Sheets

(51) Int. Cl.
  *H04N 5/91* (2006.01)
  *H04N 9/82* (2006.01)
  *H04N 5/77* (2006.01)
  *G06F 17/30* (2006.01)
  *G06K 9/00* (2006.01)
  *H04N 5/765* (2006.01)

(52) U.S. Cl.
  CPC ............ *H04N 5/772* (2013.01); *G06F 17/3028* (2013.01); *G06F 17/30265* (2013.01); *G06K 9/00664* (2013.01)

(56) References Cited

U.S. PATENT DOCUMENTS

| | | | | |
|---|---|---|---|---|
| 2003/0210808 | A1* | 11/2003 | Chen et al. | 382/118 |
| 2005/0104976 | A1* | 5/2005 | Currans | 348/231.5 |
| 2007/0043748 | A1* | 2/2007 | Bhalotia et al. | 707/101 |
| 2008/0208791 | A1* | 8/2008 | Das et al. | 707/1 |
| 2010/0124378 | A1* | 5/2010 | Das et al. | 382/225 |
| 2012/0109901 | A1 | 5/2012 | Mase | |
| 2013/0170753 | A1* | 7/2013 | Tanaka et al. | 382/190 |

FOREIGN PATENT DOCUMENTS

| | | |
|---|---|---|
| JP | 2006-203574 | 8/2006 |
| JP | 2007-58532 | 3/2007 |
| JP | 2007-213183 | 8/2007 |
| JP | 2008-250444 | 10/2008 |
| JP | 2010-211468 | 9/2010 |
| WO | 2011/001587 | 1/2011 |

OTHER PUBLICATIONS

International Search Report issued Jun. 12, 2012 in International (PCT) Application No. PCT/JP2012/001392.

Hironobu Fujiyoshi, "Gradient-Based Feature Extraction—SIFT and HOG—", Information Processing Society of Japan, SIG Technical Reports CVIM160, pp. 211-224, 2007 along with English translation.

Mor Naaman et al., "Automatic Organization for Digital Photographs with Geographic Coordinates", the 4th ACM/IEEE-CS joint conf. on Digital libraries, pp. 53-62, 2004.

* cited by examiner

FIG. 2

| Image data No. | File name | Metadata information ||||||| |
|---|---|---|---|---|---|---|---|---|
| | | Photograph-taken time info | Latitude | Longitude | ISO | Exposure | WB | ... |
| ID 1 | Image001.jpg | 2010/05/05 13:05 | +43.0523 | +142.7266 | 100 | 1/40 sec | Auto | ... |
| ID 2 | Image002.jpg | 2010/05/05 14:13 | +43.0524 | +142.7260 | 200 | 1/40 sec | Auto | ... |
| ID 3 | Image003.jpg | 2010/05/05 14:15 | +43.0531 | +142.7255 | 100 | 1/640 sec | Auto | ... |
| ID 4 | Image004.jpg | 2010/05/05 14:16 | +43.0532 | +142.7251 | 100 | 1/640 sec | Auto | ... |
| ... | ... | ... | ... | ... | | ... | ... | ... |

| Image data number | Image feature values | | | | | | | |
|---|---|---|---|---|---|---|---|---|
| | Color 1 | Color 2 | Edge 1 | Edge 2 | Local 1 | Local 2 | Face | Number of Faces |
| ID 1 | 85 | 50 | 11 | 0 | Vector 1-1 | Vector 1-2 | Detected | 1 |
| ID 2 | 45 | 10 | 30 | 40 | Vector 2-1 | Vector 2-2 | Detected | 3 |
| ID 3 | 21 | 135 | 100 | 12 | Vector 3-1 | Vector 3-2 | Not detected | 0 |
| ID 4 | 60 | 42 | 28 | 67 | Vector 4-1 | Vector 4-2 | Not detected | 0 |
| ... | ... | ... | ... | ... | ... | ... | ... | ... |

FIG. 6

| Photo-unit No. | Hierarchy level 1 | Hierarchy level 2 | Hierarchy level 3 | Hierarchy level 4 | ... |
|---|---|---|---|---|---|
| Unit T1 | Spring Within 1 km Family | Neighborhood Family members A/B/C | Morning Neighborhood/ Indoors | Early morning | ... |
| Unit T2 | | | | Sequential shooting | ... |
| Unit T3 | | | Noon Neighborhood/ Outdoors | Family member C | ... |
| Unit T4 | | Family members A/B | | Sequential shooting | ... |
| Unit T5 | | | Night Around station | Sequential/ Indoors | ... |
| Unit T6 | | | | Outdoors | |

FIG. 7

| Object category name | Model information |
|---|---|
| Cherry blossoms | Feature values of cherry blossoms (Model info A) |
| Apricot blossoms | Feature values of apricot blossoms (Model info B) |
| Autumnal tints | Feature values of autumnal tints (Model info C) |
| Tulip | Feature values of tulip (Model info D) |
| Cosmos | Feature values of cosmos (Model info E) |
| Bamboo shoot | Feature values of bamboo shoot (Model info F) |
| Edible wild plant | Feature values of edible wild plant (Model info G) |
| Chestnut | Feature values of chestnut (Model info H) |
| Carp streamer | Feature values of carp streamer (Model info I) |
| Hina-doll | Feature values of Hina-doll (Model info J) |
| . . . | . . . |

| Object category name | Similarity attribute | Priority |
|---|---|---|
| Cherry blossoms | Plant 01 | 1.0 |
| Apricot blossoms | Plant 01 | 1.0 |
| Autumnal tints | Plant 01 | 1.0 |
| Tulip | Plant 02 | 1.0 |
| Cosmos | Plant 02 | 1.0 |
| Bamboo shoot | Food 01 | 1.0 |
| Edible wild plant | Food 01 | 1.0 |
| Chestnut | Food 01 | 1.0 |
| Carp streamer | Artifact 01 | 1.0 |
| Hina-doll | Artifact 01 | 1.0 |
| Outdoor stove | Artifact 01 | 1.0 |
| ... | ... | ... |

| Object category name | Season | Indoors/Outdoors | Participants | Location | ... |
|---|---|---|---|---|---|
| Cherry blossoms | Spring | Outdoors | — | School ... | ... |
| Apricot blossoms | Spring | Outdoors | Adults | Park ... | ... |
| Autumnal tints | Fall | Outdoors | — | Temple ... | ... |
| Tulip | Spring | Outdoors | Children | School ... | ... |
| Hydrangea | Spring | Outdoors | Adults | Park ... | ... |
| Bamboo shoot | Spring | Indoors & Outdoors | Middle group | Bamboo grove ... | ... |
| Edible wild plant | Spring | Indoors & Outdoors | Middle group | Mountain ... | ... |
| Chestnut | Fall | Indoors & Outdoors | Middle group | Mountain ... | ... |
| Carp streamer | Spring | Outdoors | Boys | Downtown ... | ... |
| Hina-doll | Spring | Indoors | Girls | Home ... | ... |
| Outdoor stove | Spring, Fall | Outdoors | Large group | Park ... | ... |
| ... | ... | ... | ... | ... | ... |

| Spring Event | Event-related items | Time information | Location Information | Human information |
|---|---|---|---|---|
| Cherry blossom viewing | Cherry blossoms, Dumplings, Street-vendor stall, Beer .... | Up to 2 to 3 hours | Park, Public facility | — |
| Entrance ceremony | Cherry blossoms, Signboard, School, School uniform .... | Half day, April | School | Child |
| Commencement ceremony | Cherry blossoms, Signboard, School, School uniform .... | Half day, March | School | Child |
| Doll's festival | Hina-doll, Chirashi Sushi, Diamond-shaped rice cake .... | March | Home | Child, Girl |
| Boy's festival | Carp streamer, Boys' Festival doll, Traditional rice cake .... | May | Home | Child, Boy |
| Outdoor activity (BBQ) | Outdoor stove, Tent, Charcoal .... | Half day, April-May | Riverside, Seaside | — |
| White Day | Restaurant, Present .... | Up to 1 day, March | — | — |
| Shellfish gathering | Clams, Rake, Bucket, Cap .... | Up to 1 day | Beach | Child |
| Field day | Sweat suit, Athletic field, Camera .... | Up to 1 day, April-May | School | — |
| Easter | Church, Egg, Rabbit .... | Up to 1 day, March-April | Church | Child |
| ... | ... | ... | ... | ... |

FIG. 11

| Object category name | Similarity attribute | Updated priority |
|---|---|---|
| Cherry blossoms | Plant 01 | 2.0 |
| Apricot blossoms | Plant 01 | 2.0 |
| Autumnal tints | Plant 01 | 1.0 |
| Tulip | Plant 02 | 2.0 |
| Cosmos | Plant 02 | 2.0 |
| Bamboo shoot | Food 01 | 2.2 |
| Edible wild plant | Food 01 | 2.2 |
| Chestnut | Food 01 | 1.2 |
| Carp streamer | Artifact 01 | 2.0 |
| Hina-doll | Artifact 01 | 2.6 |
| Outdoor stove | Artifact 01 | 1.0 |
| ... | ... | ... |

| Image data No. | Object category | Likelihood | Reliability |
|---|---|---|---|
| ID 1 | Hina-doll | 1.25 | 1 |
| ID 2 | Cherry blossoms | 0.4 | 0 |
| ... | ... | ... | ... |

T50

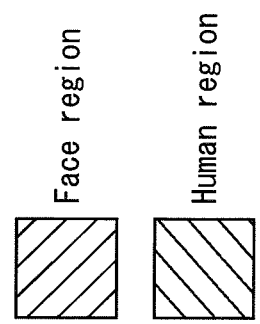
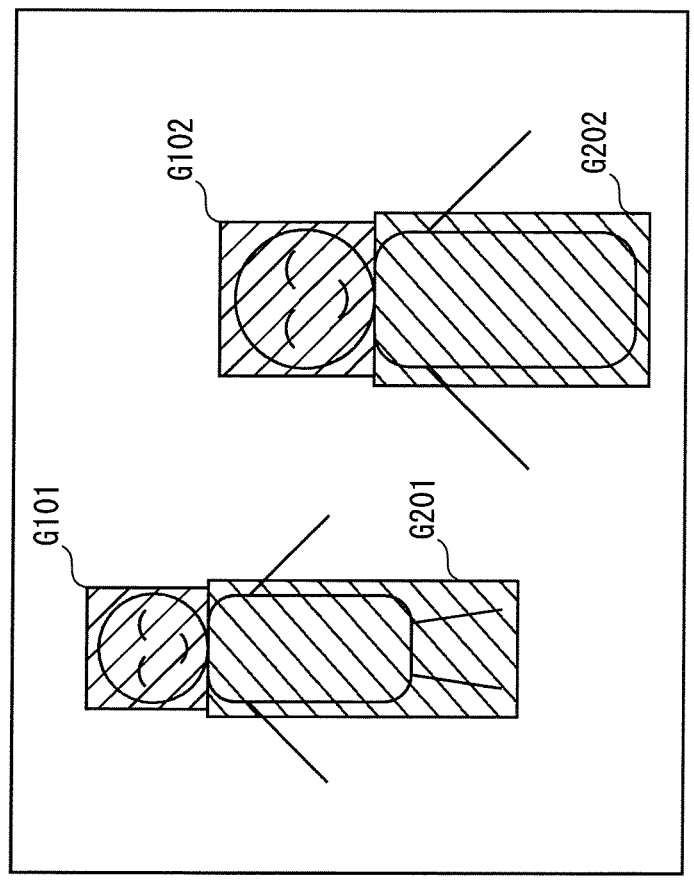
FIG. 20

| Object category name | Model information | Diversity information |
|---|---|---|
| Cherry blossoms | Feature values of cherry blossoms (Model info A) | High |
| Apricot blossoms | Feature values of apricot blossoms (Model info B) | High |
| Autumnal tints | Feature values of autumnal tints (Model info C) | High |
| Tulip | Feature values of tulip (Model info D) | High |
| Cosmos | Feature values of cosmos (Model info E) | High |
| Bamboo shoot | Feature values of bamboo shoot (Model info F) | Low |
| Edible wild plant | Feature values of edible wild plant (Model info G) | Low |
| Chestnut | Feature values of chestnut (Model info H) | Low |
| Carp streamer | Feature values of carp streamer (Model info I) | Low |
| Hina-doll | Feature values of Hina-doll (Model info J) | High |
| Airplane | Feature values of airplane (Model info K) | Low |
| Train | Feature values of train (Model info L) | Low |
| Potted plant | Feature values of potted plant (Model info M) | High |
| ... | ... | ... |

IMAGE PROCESSING DEVICE THAT ASSOCIATES PHOTOGRAPHED IMAGES THAT CONTAIN A SPECIFIED OBJECT WITH THE SPECIFIED OBJECT

TECHNICAL FIELD

The present relates to an image processing device for tagging images in a user's collection.

BACKGROUND ART

Recent years have seen a proliferation of DSCs (Digital Still Cameras) and digital single-lens reflex cameras for photographing images of photographic subjects as well as mobile camera phones and digital movie cameras. Furthermore, larger capacity recording mediums are becoming available for storing image data. These technological advances permit end users to keep a massive amount of AV (Audio Video) contents, such as static images and video images. However, it is time- and labor-consuming for a user to find a desired image from such a massive amount of still images and video images.

In order to ensure an effective retrieval of an image that the user desires, attention is being given to a technique to aid in organizing a user's collection of images by automatically classifying and tagging objects appearing in the images.

In one known approach (see Patent Literature 1), for example, a plurality of image recognition engines and model dictionaries are prepared in advance for each of a plurality of themes to allow easy and prompt acquisition of information related to respective images. When a user specifies a theme, a model dictionary and recognition engine prepared for the specified theme are used to tag objects appearing in target images and to extract information related the objects. In this way, information related to a specific object of user's interest is effectively extracted.

CITATION LIST

Patent Literature

Patent Literature 1

Japanese Patent Application Publication No. 2007-58532

SUMMARY OF INVENTION

Technical Problem

It is noted, however, that tagging of images (association with objects) according to the technique disclosed in Patent Literature 1 requires the user to manually specify an image recognition engine and a model dictionary to be employed for processing the images. In such a case, the task of specifying image recognition engines and model dictionaries to be employed for tagging becomes increasingly difficult as the number of images to be processed increases, which results in more burdens imposed on the user.

In view of the above problems, the present invention aims to provide an image processing device, image processing method, computer program, and integrated circuit for associating images with objects appearing in the images, while reducing burden on the user.

Solution to Problem

To achieve the aim stated above, the present invention provides an image processing device including: an attribute storage unit that stores a photographic attribute for each of a plurality of events, each photographic attribute indicating a photographic condition predicted to be met with respect to an image photographed in the corresponding event; an object information storage unit that stores, for each event and in advance, an object predicted to appear in an image photographed in the corresponding event; an extracting unit that extracts from a collection of photographed images a photographic attribute that is common among a predetermined number of photographed images in the collection, based on pieces of photography-related information of the respective photographed images; a specifying unit that specifies an object stored, in the object information storage unit, for an event corresponding to the extracted photographic attribute; and an associating unit that conducts a process on the collection of photographed images to associate each photographed image containing the specified object with the object.

Advantageous Effects of Invention

With the configuration stated above, the image processing device performs a process for associating target images with objects after specifying potential objects that are likely to appear in images photographed at a specific event associated with the photographic attributes of the target images. This eliminates the need for the user to specify potential objects to be used for the association process, reducing the user's trouble required for the association process.

BRIEF DESCRIPTION OF DRAWINGS

FIG. 2 is a view showing an example of the data structure of metadata information table T1.

FIG. 3 is a view showing an example image feature values extracted by an image feature value computing unit 12.

FIG. 6 is a view showing an example of common attributes acquired from the photo-units extracted by the photo unit extracting unit 132.

FIG. 7 is a view showing an example of the data structure of a table T10 containing pieces of model information for respective object categories, each piece of model information indicating the feature value of the corresponding object category.

FIG. 8 is a view showing an example of the data structure of a basic event object table T20.

FIG. 9 is a view showing an example of the data structure of an attribute information table T30.

FIG. 10 is a view showing an example of the data structure of an event information table T40.

FIG. 11 is a view showing an example of the data structure of an updated basic event information table T21.

FIG. 12 is a view showing an example of the data structure of a classification result information table T50.

FIG. 20 is a view showing an example of a result of face region detection and human region detection.

FIG. 32 is a view showing the data structure of a table T100 containing diversity information.

DESCRIPTION OF EMBODIMENTS

The following describes embodiments of the present invention with reference to the accompanying drawings.

1. Embodiment 1

The following describes an embodiment of the present invention with reference to the accompanying drawings. First, Embodiment 1 is directed to an arrangement applicable to an image classification device used for organizing a user's collection of images, which may include a large number of static images and video images taken within a local domain, such as user's household. According to the arrangement, attributes common among the collection of images are used to ensure accurate automatic classification of objects (physical objects) appearing in the images.

1.1 Structure

Figure 1:
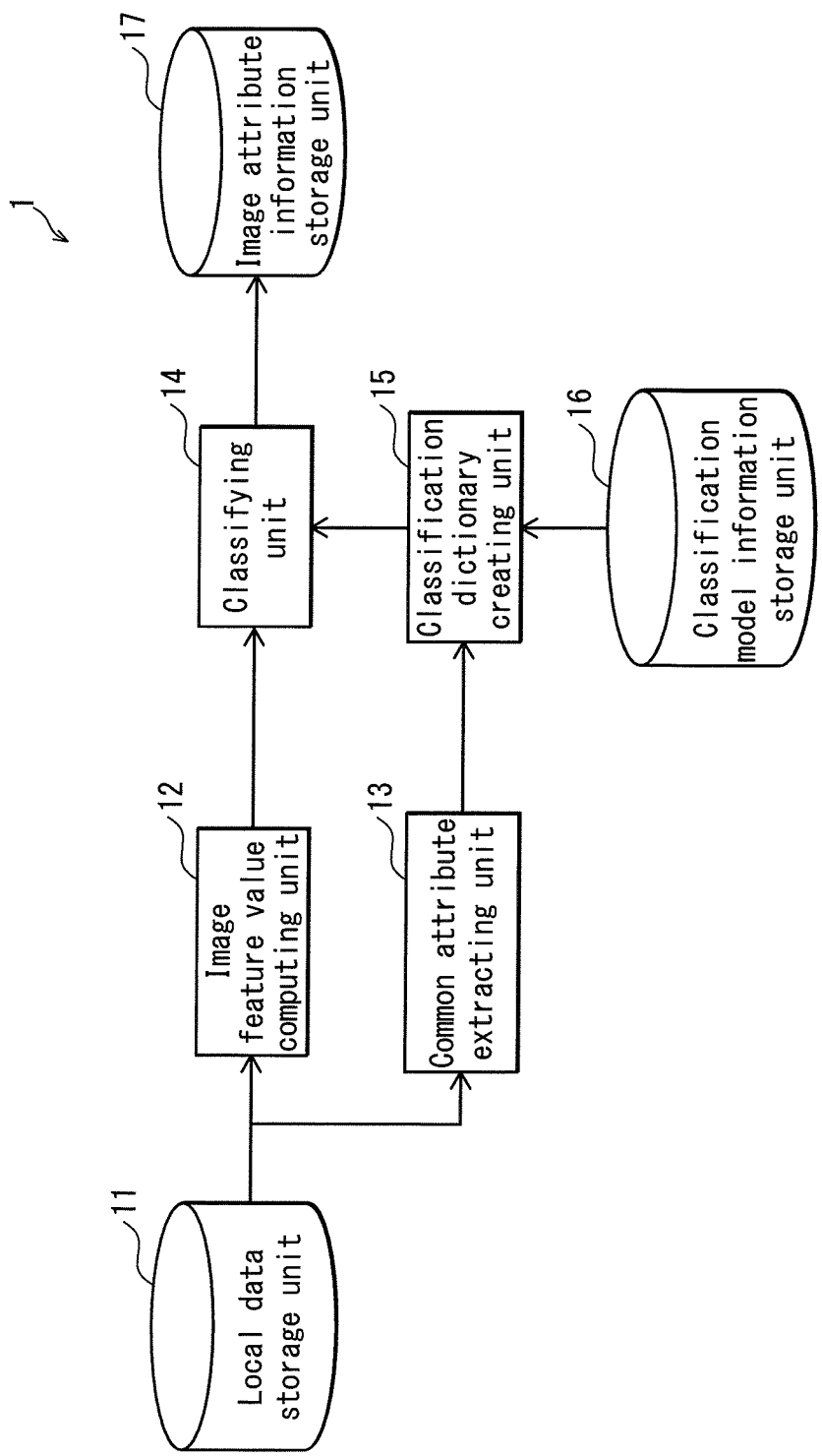
FIG. 1 is a block diagram showing the structure of an image classification device (image processing device) 1.

FIG. 1 is a block diagram showing the structure of an image classification device (image processing device) 1. In FIG. 1, the image classification device 1 includes a local data storage unit 11, an image feature value computing unit 12, a common attribute extracting unit 13, a classifying unit 14, a classification dictionary creating unit 15, a classification model information storage unit 16, and an image attribute information storage unit 17.

(1) Local Data Storage Unit 11

The local data storage unit 11 is a recording medium storing file data possessed by a limited number of users for use within the user's household, for example. For example, the local data storage unit 11 stores digital photographs and motion pictures shot by family members. The local data storage unit may be a large capacity media disc, such as HDD or DVD, or a storage device, such as a semiconductor memory.

In addition, the local data storage unit 11 stores metadata information of images, which are file data (digital photographs and motion pictures) shared within the user's household, for example. Metadata information is applied to each image at the time when the image is photographed. Examples of metadata information of an image may include the following information available in EXIF (Exchangeable Image File Format): GPS (Global Positioning System) information indicating where and when the image was taken; photographing method information indicating the photographing mode; and various camera parameters employed in the photographing.

FIG. 2 shows an example of a metadata information table T1 containing pieces of metadata information. As shown in FIG. 2, the metadata information contained in the metadata information table T1 is associated piece by piece with an image data number uniquely identifying a corresponding image. As shown in FIG. 2, each piece of metadata information includes: a file name, photograph-taken time information indicating the time at which the image was photographed; latitude and longitude information acquired from GPS information as information indicating the geographic location at which the image was photographed; and camera parameter information, such as ISO (International Organization for Standardization) sensitivity information for adjusting the as-photographed light level, exposure information for adjusting the brightness to a suitable level for viewing, and WB (White Balance) information for adjusting the as-photographed color balance. Note that image information may additionally include the image feature values that can be computed from results of image analysis carried out by the image feature value computing unit 12.

(2) Image Feature Value Computing Unit 12

The image feature value computing unit 12 computes, as features of an image, high-order feature values which are specific to an object. The high-order feature values are computed from low-order feature values which rerate to fundamental features of the image, such as edges, colors, and texture.

Examples of high-order feature values include: local feature values describing the features of a local region centered at a feature point, such as SIFT (Scale-Invariant Feature Transform); feature values describing the shape of an object, such as HOG (Histogram of oriented Gradient); and so on. The image feature value computing unit 12 may compute unique feature values usable to recognize a specific object (physical object), such as a human face, a person, or an item appearing in an image. Details of specific schemes thereof are found in Patent Literature (Japanese Patent Application Publication No. 2008-250444) describing a face detection device, which is already put to practical use. As for the details of human detection and a generic object detection, details are found in "Gradient based Feature Extraction —SIFT and HOG—" by Hironobu FUJIYOSHI (Report from and information processing society of Japan, CVIM 160, pp. 211-224, 2007).

One example of image feature values extracted by the image feature value computing unit 12 is shown in FIG. 3. The image feature values may be high-order feature values specific enough to describe an object, and the high-order values may be computed from low-order feature values, such as color information and texture information, which are considered as fundamental feature information of an image. The image feature values are stored separately under image data numbers, and a set of image feature values for one image may include colors 1 and 2, edges 1 and 2, locals 1 and 2, face, the number of faces, and so on.

The colors 1 and 2 are pieces of color information computed as the intra-image statistic values from RGB values of a corresponding image. Note that the color information of an image may be values computed as hue information by conversion into the HSV or YUB color space. Alternatively, the color information may be values computed as statistic values of color histogram or color moments, for example.

The edges 1 and 2 are pieces of texture information, which are intra-picture statistic values of features detected at each predetermined angular increment by line segment detection of the image.

The locals 1 and 2 are high-order features describing features of a local region centered at a feature point or describing the shape of a physical object. Specific examples include feature values, such as SIFT, SURF, and HOG.

The face refers to information indicating whether any face is recognized in the image, based on the face information obtained by a feature detection technique or other technique. The number of faces refers to information indicating the number of faces recognized in the image.

The image features may additionally include human related image information recognized by human detection technique, such as the size of a face recognized in the image, the color and appearance of clothing. Furthermore, additional examples usable as image features include results obtained by other image recognition techniques, typified by vehicle detection or pet (such as dogs and cats) detection.

(3) Common Attribute Extracting Unit 13

The common attribute extracting unit 13 extracts at least one attribute common among a group of images stored in the local data storage unit 11.

The common attribute extracting unit 13 extracts common attributes from the group of images with the use of metadata information and tag information manually applied by the user. More specifically, metadata information or tag information common among the group of images are extracted as common attributes. Furthermore, common attribute information may be extracted by using human information detectable by face detection or human detection, photograph occasion information provided by the user, and so on.

The following describes the detailed structure of the common attribute extracting unit 13.

Figure 4:
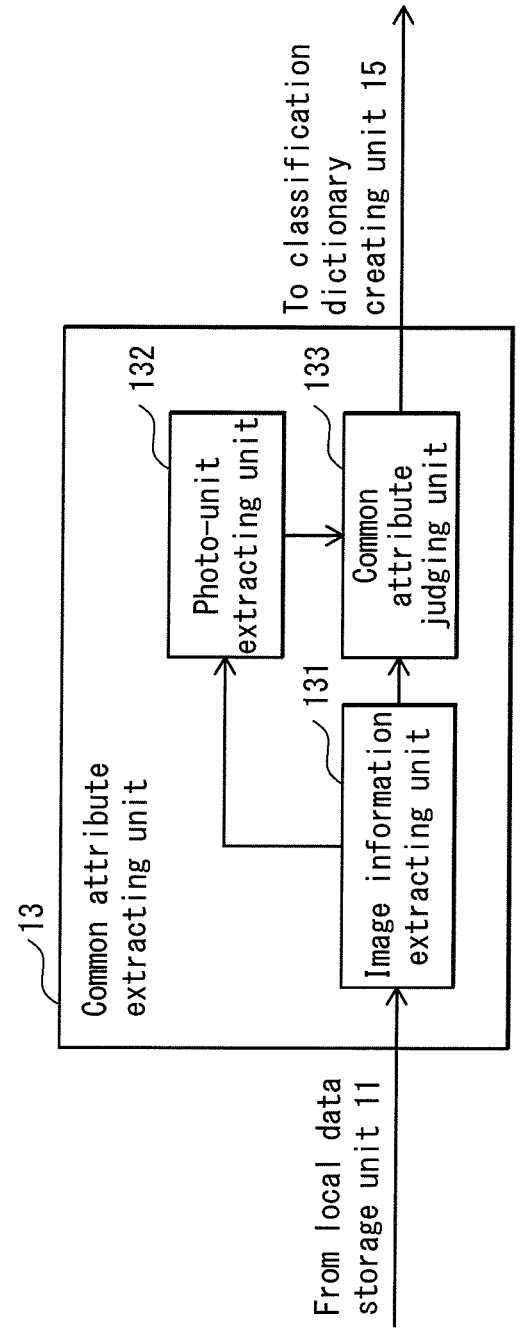
FIG. 4 is a block diagram showing the structure of a common attribute extracting unit 13.

As shown in FIG. 4, the common attribute extracting unit 13 includes an image information extracting unit 131, a photo-unit extracting unit 132, and a common attribute judging unit 133.

(3-1) Image Information Extracting Unit 131

The image information extracting unit 131 acquires image information which includes metadata information and tag information from each of the images targeted for classification.

(3-2) Photo-Unit Extracting Unit 132

The photo-unit extracting unit 132 divides the images into groups of a series of images assumed to be taken in the same event, with reference to the image information extracted by the image information extracting unit 131. Hereinafter, each group thus formed is referred to as a photo-unit.

More specifically, the photo-unit extracting unit 132 divides images into photo-units each composed of consecutive images taken at intervals shorter than a predetermined time period, or consecutive images taken at locations within a predetermine distance or inside predetermined site. In some schemes, the boundaries between photographed events may be determined using time information and location information in combination. The details thereof are found, for example, in "Automatic Organization for Digital Photographs with Geographic Coordinates" (the 4th ACM/IEEE-CS joint conf. on Digital libraries, pp. 53-62, 2004), written by Mor Naaman etc.

Also, the photo-unit extracting unit 132 may place images into the same photo-unit, on condition that the similarly among faces detected in the images or the similarity in human information with respect to the number of recognized people or appearance of clothing shows a higher score than a predetermined score. Also, the photo-unit extracting unit 132 may place images into the same photo-unit, on condition that the similarity in photographing mode information of the camera or information about the camera parameters shows a higher score than a predetermined score.

Also, the photo-unit extracting unit 132 may divide images into photo-units as intended by the user, by using tag information indicating the event names directly annotated by the user.

Note that images may be divided into photo-units using a combination of the grouping schemes described above.

(3-3) Common Attribute Judging Unit 133

The common attribute judging unit 133 extracts attributes common among the images within the individual photo-units determined by the photo-unit extracting unit 132, with reference to the image information extracted by the image information extracting unit 131 for each image in the photo-unit.

The types of common attributes include: time information, such as the season, temperature, photographic rate, and hours at which the images were taken; location information, such as proximity of the photographed locations, the indication of indoors or outdoors, and landmark; human information, such as the indication of family members and other participants in the event and the their ages; photographing method information, such as the photographing mode and photography parameters of the camera; and photograph occasion information, such as the event names annotated by the user. For example, the season can be specified based on the time at which the image was photographed. The temperature may be acquired from an external device on the basis of the time and location the image was photographed. Alternatively, the image classification device 1 may be provided with a thermometer and measure the temperature each time an image is photographed, so that the measured temperature is included in metadata information.

Also, a common attribute may be a statistic of at least one type of attributes among the various types of attributes mentioned above. For example, based on time information acquired from each of one or more images included in a photo-unit, the time period during which the images were taken is determined. Then, the season to which the thus specified time period belongs is specified as a statistic. Alternatively, based on location information acquired from each of one or more images included in a photo-unit, the spatial region within which the images were taken is specified. Then, it is determined whether the thus specified spatial region falls inside the user's house, neighborhood, or else. The determination result is usable as a common attribute.

Also, family-structure information indicating how the family is set up may be computed, as a statistic, from human information. For example, based on the human information, the number of images in which the father, mother, brothers, and sisters appear may be computed among all the images in a photo-unit. When the computation result shows that every family member appears in at least one image in the photo-unit, the family-structure information is generated from the pieces of human information related to the respective family members. The thus generated family-structure information is used as a common attribute. Also, in addition to family-structure information, information relating to friends and relatives may be generated based on human information.

Also, information relating to a person determined based on the human information may be estimated (as human object information), and common attributes may be extracted based on human object information. For example, the age of each person appearing in an image may be estimated as human object information and a statistic is computed based on the estimated age. For this case, people appearing in a photo-unit composed of one or more images are extracted, and the age of each person detected is estimated. Then, the estimated ages are categorized into age brackets, such as teens or younger, twenties, thirties, and so on to count the distributed numbers in the respective age brackets as statistics. Note that the estimation is not limited to ages, and also applicable to other information that can be estimated from human information, such as male or female, adult or child, and so on.

(3-4) Specific Example

The following describes the details of processing for extracting common attributes from each photo-unit extracted by the photo-unit extracting unit 132. The following description is given with reference to FIG. 5 showing an example of photo-units extracted by the photo-unit extracting unit 132 from a group of images photographed within a relatively short period of time (one day).

The photo-unit extracting unit 132 extracts photo-units each composed of images consecutively photographed within a predetermined period. The thus extracted photo-units are designated as units T1-T6. In addition, the photo-unit extracting unit 132 extracts photo-units each composed of images photographed within a predetermined spatial region (the change in locations of images is within 100 m). The thus extracted photo-units are designated as units P1-P3.

When extracting common attributes, the common attribute judging unit 133 first searches, for example, each smallest photo-unit (units T1 to T6, in this example) to find any attribute common among the pieces of image information of the respective images within that photo-unit. Then, the common attribute judging unit 133 creates a hierarchy of photo-units by merging photo-units shearing a common attribute into a photo-unit on a higher hierarchical level (units P1 to P3 in this example). Then, the common attribute judging unit 133 searches each of the photo-units on the higher hierarchical level to find any attribute common among the pieces of image information of the respective images included in that photo-unit. The attributes thus extracted are output as common attributes.

Figure 5:
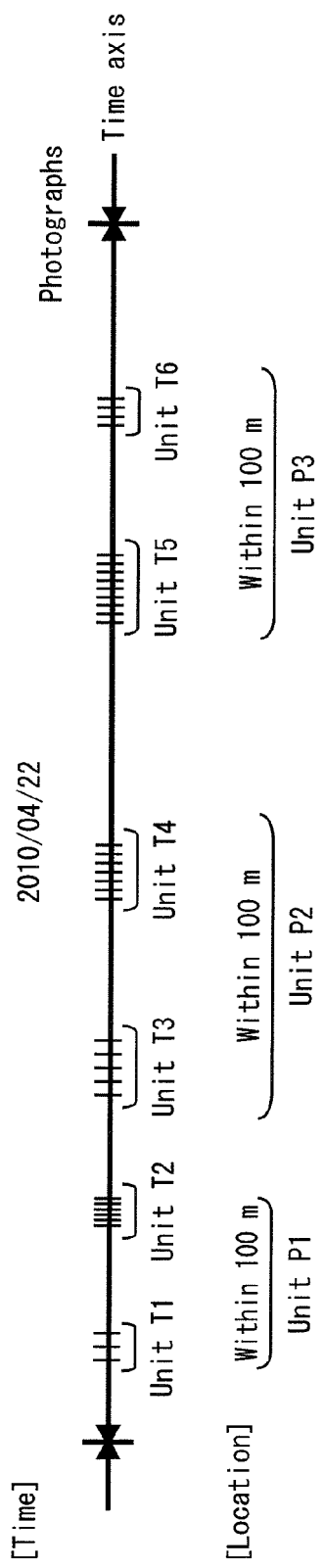
FIG. 5 is a view showing an example of photo-units extracted by a photo-unit extracting unit 132.

FIG. 6 shows an example of common attributes extracted in the example shown in FIG. 5. The hierarchical level 4 shows attributes common within each of the photo-units T1-T6, whereas the hierarchical level 3 shows attributes common within each of photo-units P1-P3. Each of the photo-units P1-P3 is composed of images that are coherent in locations as well. The hierarchical level 2 shows common attributes, which are information indicating people commonly appearing in all relevant photo-units. The common attributes on this hierarchical level are extracted by accruing human information using image feature value information resulting from face detection and so on. Finally, the hierarchical level 1 shows attributes common among all the photo-units.

It is also applicable to extract smaller photo-units using various types of information, such as photographing mode information, camera parameters, and so on, so that common feature extraction is carried out for each of such a smaller photo-unit. It is also applicable to hierarchically organize the images according to the tags directly applied by the user or on the basis of photo-units grouped directly by the user. In addition, it is applicable to extract common attributes based on the pieces of image information that holds true over a relatively long term, such as image information relevant to a photo-unit composed of images photographed over several days, as in the case of a trip, or to the family structure or photographing manner for a given event.

(4) Classifying Unit 14

The classifying unit 14 makes a judgment, with the use of a classifier, for each of images to be classified, based on feature values computed from the image and one or more pieces of model information indicated by a classification dictionary created by the classification dictionary creating unit 15. Through the judgment, the classifying unit 14 identifies any model appearing in each image.

Examples of a typical classifier include GMM (Gaussian mixture model) and SVM (Support Vector Machine) classifiers. Each piece of model information is generated by modeling sample feature values usable to recognize, for example, a human face or human body appearing in images. The classifier outputs information indicating a model identified in the images to be classified and the likelihood providing a reliability measure of the identification. In general, a larger likelihood value indicates a higher reliability.

The classifying unit 14 stores the identification results and their likelihoods output from the classifier into the image attribute information storage unit 17, in association with image data numbers each identifying corresponding one of the images to be classified.

(5) Classification Model Information Storage Unit 16

The classification model information storage unit 16 is a storage medium used to store pieces of model information associated with the respective object categories (objects). In one example, the feature values of images may be directly usable as model information, or the results obtained by weighting the feature values may also be usable as model information. The approaches for computing the feature values of images as model information include GMM and SVM as described above. In addition, ADABOOST is one alternative approach. These approaches are already known in the art and thus a description thereof is omitted. Here, FIG. 7 shows an example of a table T10 containing pieces of model information each of which represents the feature values for a corresponding object category. The table T10 has a storage area for storing a plurality of records each composed of the fields for an object category name and model information. For example, a record with the object category name "cherry blossoms" contains the feature values representing an image of cherry blossoms.

The classification model information storage unit 16 stores a basic event object table T20 shown in FIG. 8. The basic event object table T20 contains basic event object information used by the classification dictionary creating unit 15. Normally, in the user's local data stored in one event, an object having a higher probability of being photographed in that event is assigned a higher classification priority. Therefore, the basic event object table T20 lists potential objects each along with a similarity attribute. Each potential object listed in the table is likely to be photographed in a specific event, and the similarity attribute specifies the type of the object. Note that the classification priority of each object is set to 1.0 by default.

The classification model information storage unit 16 additionally stores an attribute information table T30 containing prioritized object attribute information used by the classification dictionary creating unit 15. An example of the attribute information table T30 is shown in FIG. 9. The attribute information table T30 lists object category names each associated with prioritized object attribute information indicating the season, indoors/outdoors, participants, locations, and so on.

The classification model information storage unit 16 additionally stores an event information table T40 containing event-related items each linked to an event, along with prioritized attribute information for each item. An example of the event information table T40 is shown in FIG. 10. As shown in FIG. 10, the event information table T40 contains, for each event, event-related items, time information, location information, and human information. The event-related items refer to physical objects representing a corresponding event. For example, the event "cherry blossom viewing" is typically represented by "cherry blossoms", "dumplings for flower viewing", "street-vendor stall", "beer", and so on. The time information indicating the period during which the corresponding event is likely to take place and the length of time that the corresponding event is likely to last. The location information indicates a location where the corresponding event is likely to be held, and the human information indicates potential participants in the event.

(6) Classification Dictionary Creating Unit 15

The classification dictionary creating unit 15 specifies one candidate event from a plurality of events based on the common attributes extracted by the common attribute extracting unit 13 and creates a classification dictionary composed of one or more object categories to which event-related items associated with the specified candidate event belongs.

More specifically, the classification dictionary creating unit 15 adjusts the priorities specifically for each of one or more photo-units extracted by the common attribute extracting unit 13, by using common attributes and prioritized object attribute information extracted from that photo-unit. For example, the common attributes extracted from the unit T1 are "spring", "neighborhood", "morning", "indoors", and "early morning", as shown in FIG. 6. The classification dictionary creating unit 15 specifies, from the attribute information table T30 shown in FIG. 9, prioritized object attribute information having a match with these common attributes and then updates the priority of the corresponding object category name according to the thus specified piece of prioritized object attribute information. FIG. 11 shows the updated basic event object table T21. In one example here, the priority of an object category name is updated by adding 1.0 if a match is found with the "season" attribute, by adding 0.2 if a match is found with the "indoors/outdoors" attribute, by adding 0.2 if a match is found with the "participants" attribute, and by adding 0.2 if a match is found with the "location" attribute. That is, the priority of the object category name "cherry blossoms" is updated to 2.0 if the season attribute is the only matching attribute. The priority of the object category name "Hina-doll" is updated to 2.6 if all the extracted common attributes find a match with the prioritized object attribute information associated with "Hina-doll". Note that the values for updating priories are not limited to positive values. Negative values may be used for updating priorities. In addition, it is applicable to compute the values for updating priorities with different weighting, depending on the types of common attributes. It is also applicable to update the priorities only on condition that two or more common attributes find a match. Any of these variations are applicable as long as the resulting priorities are usable to limit potential objects, which possibly appear in images photographed in a specific event.

Upon updating the priorities, the classification dictionary creating unit 15 computes, for each event listed in the event information table T40, a sum of the priorities of all the event-related items representing the corresponding event and specifies an event with the largest sum as the candidate event.

The classification dictionary creating unit 15 creates a classification dictionary by selecting, out of the event-related items representing the specified candidate event, one or more event-related items (object categories) having a priority not lower than a predetermined threshold and mutually differ in similarity attributes. For example, in the case where the event "cherry blossom viewing" has the highest priority, the classification dictionary creating unit 15 creates a classification dictionary by selecting event-related items having relatively high priorities out of all the event-related items for that event, namely "cherry blossoms", "dumplings for flower viewing", "street-vendor stall", "beer", and so on.

(7) Image Attribute Information Storage Unit 17

The image attribute information storage unit 17 is a recording medium used to store information indicating each classification model identified as a result of classification by the classifying unit 14, the likelihood serving as a measure of the reliability of the result of classification, and so on.

As an example of a result of classification, a classification result information table T50 is shown in FIG. 12.

The classification result information table T50 has a storage area for storing one or more records each having the fields for an image data number, object category, reliability, and likelihood.

The image data number is an identifier for uniquely identifying an image. The object category indicates a piece of model information used for classification of the corresponding image.

The likelihood is a value indicating the probability that an object appearing in an image identified by the corresponding image data number matches the model information used for the classification.

The reliability is indicates whether the classification result is reliable. In this example, when the corresponding likelihood is not lower than a predetermined value (0.7 or larger, for example), the reliability value is set to 1, which means that the classification result is reliable. On the other hand, when the corresponding likelihood is lower than the predetermined threshold (smaller than 0.7, for example), the reliability value is set to 0, which means that the classification result is not reliable.

1.2 Operation

A description is given of the operation of the image classification device 1.

(1) Overall Operation

The image classification device 1 starts the classification process on objects appearing in images when the images to be targeted for classification are selected by the user or automatically when the local data targeted for classification reaches a predetermined number of images or videos. Once the classification process is started, the image classification device 1 extracts common attributes from the target images, creates a classification dictionary based on the extracted common attributes, and classifies objects appearing in the target images.

Figure 13:
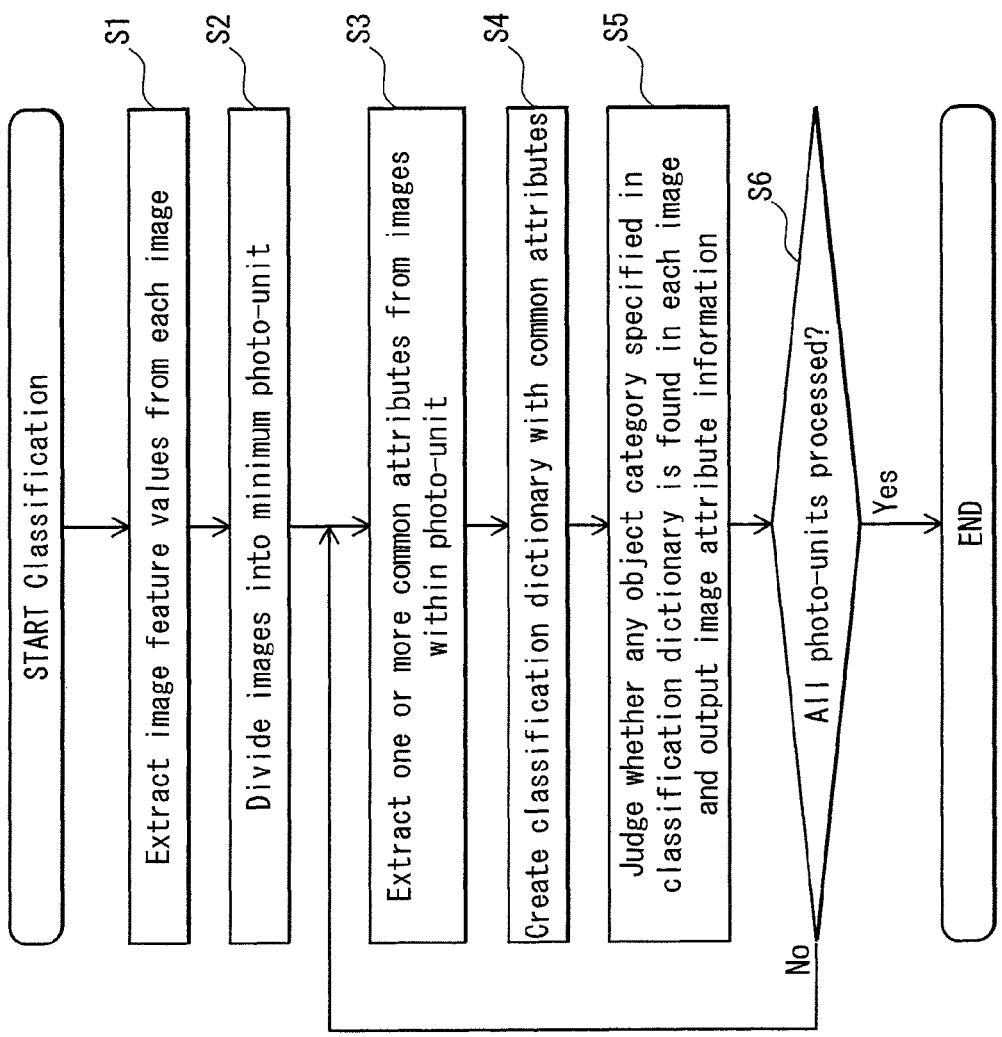
FIG. 13 is a flowchart of a classification process.

The following describes the classification process, with reference to the flowchart shown in FIG. 13.

The image feature value computing unit 12 acquires target images from the local data storage unit 11 and computes image feature values for each of the acquired target images (Step S1).

The image information extracting unit 131 of the common attribute extracting unit 13 acquires image information, such as metadata information and tag information, form each target image; and with reference to the thus acquired image information, the photo-unit extracting unit 132 divides the target images into one or more photo-units each composed of a series of images assumed to be photographed in the same event by the user (Step S2).

The common attribute judging unit 133 extracts common attributes among the images in one photo-unit, with reference to the pieces of image information extracted from the images in that photo-unit by the image information extracting unit 131 (Step S3).

The classification dictionary creating unit 15 creates a classification dictionary with the use of the one or more common attributes extracted by the common attribute extracting unit 13 as well as the object categories stored in the classification model information storage unit 16 (Step S4). The classification dictionary created herein is for use by the classifying unit 14.

The classifying unit 14 determines, for each of the target images in a currently processed photo-unit, whether any feature appearing in the image matches the model information corresponding to any object category specified in the classification dictionary created by the classification dictionary creating unit 15; and outputs to the image attribute information storage unit 17 the determination results indicating the likelihood for each matching feature and the image data number identifying the relevant one of the target images (Step S5).

The image classification device 1 judges whether or not the classification process has been completed for all the photo-units (Step S6). On judging that all the photo-units have been processed (Step S6: Yes), the image classification device 1 ends the entire classification process. On judging that all the photo-units have not yet been processed (Step S6: No), the image classification device 1 goes back to Step S3.

(2) Creating Classification Dictionary

Figure 14:
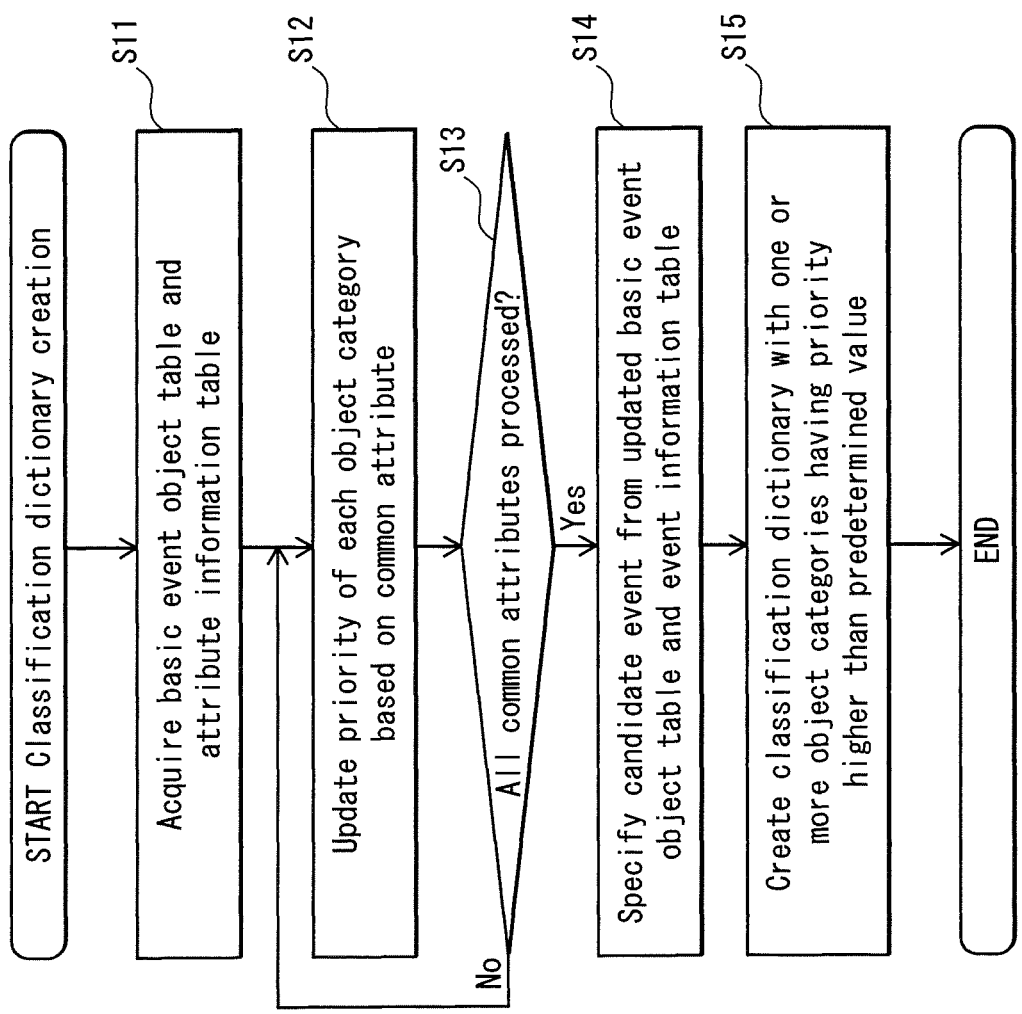
FIG. 14 is a flowchart of a classification dictionary creation process.

The following describes the processing of creating a classification dictionary performed in Step S4 shown in FIG. 13, with reference to the flowchart shown in FIG. 14.

The classification dictionary creating unit 15 acquires the basic event object table T20 and the attribute information table T30 to limit classification models to be used for the classification (Step S11).

The classification dictionary creating unit 15 updates the basic event object table T20 with respect to the priority of each of one or more object categories matching common attributes extracted by the common attribute extracting unit 13 (Step S12).

The classification dictionary creating unit 15 judges whether the priorities relevant to all the extracted common attributes have been updated (Step S13). If it is judged that not all the relevant priorities are updated yet (Step S13: No), the processing goes back to Step S12.

On judging that all the relevant priorities have been updated (Step S13: Yes), the classification dictionary creating unit 15 specifies a candidate for the event in which the target images are assumed to be photographed, with reference to the basic event object information having been updated and the event information table T40 (Step S14). More specifically, the classification dictionary creating unit 15 computes, for each event included in the event information table T40, a sum of priorities assigned to the event-related items (object categories) for that event. Note that the sums are computed based on the updated priorities. Then, the event resulting in the largest sum is specified as the candidate event. Consequently, the classification dictionary creating unit 15 is enabled to specify a candidate for the event in which the target images were photographed.

The classification dictionary creating unit 15 creates a classification dictionary which is a collection of one or more event-related items (object categories) each having a priority not lower than the predetermined threshold, out of the event-related items representing the specified candidate event (Step S15).

1.3 Effects of Embodiment 1

As described above, unlike a conventional approach of classifying images by using all generic objects as potential objects based mainly on intra-image feature values, the image classification device 1 performs a classification process using pieces of model information limited with reference to common attributes extracted from the user's collection of images. The above configuration ensures accurate classification of the user's collection of images, which may include static images and video images. Such classification is advantageous for automatically tagging or organizing the images as well as for effective retrieval of an image desired by the user.

2. Embodiment 2

The following describes Embodiment 2 of the present invention, with reference to the accompanying drawings. Embodiment 2 is directed to an arrangement applicable to an image classification device used for organizing a user's collection of images, which may include a large number of static images and video images taken within a local domain, such as user's household. According to the arrangement, common attributes among the collection of images are used for the classification, and the classification process is recursively performed using the classification result of the previous process. As a consequence, objects (physical objects) appearing in the images are automatically classified with accuracy. In the description of Embodiment 2, the same reference signs are used to denote components having the same functionality as the components described in Embodiment 1. In addition, since the same description is applicable, no further description is given below.

The following is a specific description of a classification process performed recursively by using potential photographic objects updated based on a previous classification result. With this method, a user's image collection, which may include static images or video images taken by the user, are accurately classified, even if a wide variety of photographic objects appear in the images.

2.1 Structure

Figure 15:
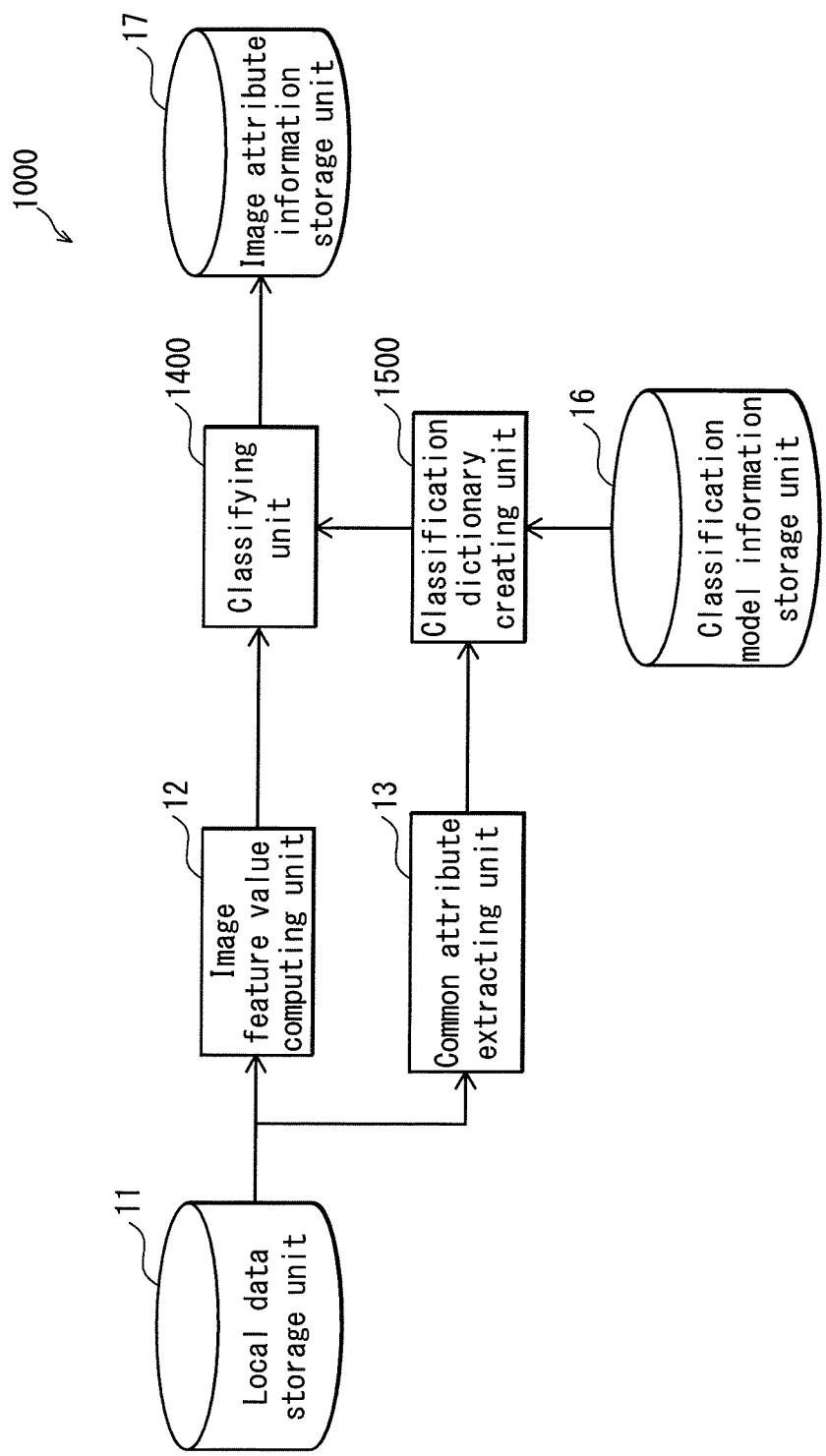
FIG. 15 is a block diagram showing the structure of an image classification device 1000.

FIG. 15 is a block diagram showing the structure of an image classification device 1000 according to Embodiment 2. In FIG. 15, the image classification device 1000 includes a local data storage unit 11, an image feature value computing unit 12, a common attribute extracting unit 13, a classifying unit 1400, a classification dictionary creating unit 1500, a classification model information storage unit 16, and an image attribute information storage unit 17.

The local data storage unit 11, image feature value computing unit 12, common attribute extracting unit 13, classification model information storage unit 16, and image attribute information storage unit 17 are the same as those described in Embodiment 1. Thus, a description thereof is omitted.

The following describes the classifying unit 1400 and the classification dictionary creating unit 1500.

(1) Classifying Unit 1400

In addition to the functionality of the classifying unit 14 described in Embodiment 1 above, the classifying unit 1400 has the following functionality.

After completing the classification process for a given one of the photo-units formed by dividing the target images, the classifying unit 1400 judges whether or not the thus obtained classification result is appropriate. More specifically, the classifying unit 1400 judges whether or not the classification is appropriate based on the ratio of the number of images determined to include any of the object categories employed for the classification to the total number of images included in the photo-unit. If the ratio is larger than a predetermined value, the classification is judged appropriate. On the other hand, if the ratio is equal to or smaller than the predetermined value, the classification is judged inappropriate.

On judging that the classification is inappropriate, the classifying unit 1400 outputs an instruction for re-creating a dictionary to the classification dictionary creating unit 1500.

On the other hand, on judging that the classification is appropriate, the classifying unit 1400 stores the classification result into the image attribute information storage unit 17.

(2) Classification Dictionary Creating Unit 1500

In addition to the functionality of the classification dictionary creating unit 15 described in Embodiment 1 above, the classification dictionary creating unit 1500 has the following functionality.

On receiving the creation instruction from the classifying unit 1400, the classification dictionary creating unit 1500 creates a new classification dictionary.

More specifically, the classification dictionary creating unit 1500 uses the event information table T40 with the updated basic event object table to specify a candidate event different from the candidate event specified in the previous classification process, based on object categories remaining after excluding the object categories used in the previous classification process (the candidate event newly specified is referred to as a "renewed candidate event"). The classification dictionary creating unit 1500 creates the new classification dictionary by selecting, out of the event-related items representing the renewed candidate event, one or more event-related items (object category) having a priority not lower than a predetermined threshold and mutually different similarity attributes.

2.2 Operation

Figure 16:
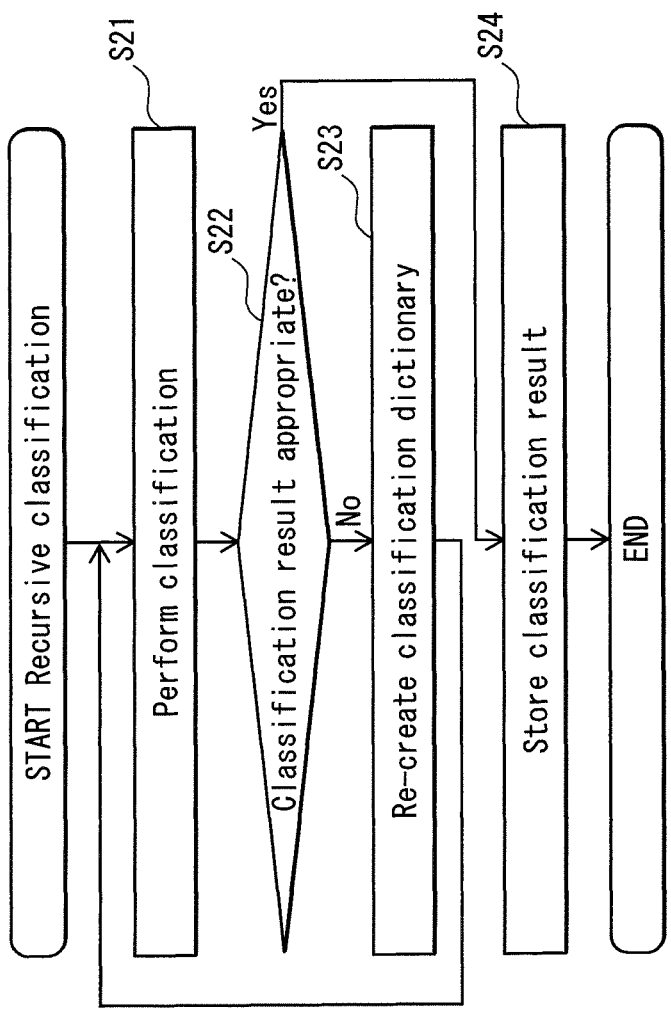
FIG. 16 is a flowchart of a reclusive classification process.

A description is given of the operation of the image classification device 1000, with reference to the flowchart shown in FIG. 16.

Once the classification process is started, the classifying unit 1400 performs the classification process to extract image attribute information from each target image having been extracted from the local data storage unit 11 (Step S21). The processing performed in Step S21 is the same as the sequence of Steps S1 to S5 shown in FIG. 13.

Once the classification process is completed, the classifying unit 1400 judges whether the classification result is appropriate or not (Step S22). More specifically, the classifying unit 1400 makes the judgment based on the conditional expression M/N>T, where N denotes the number of images included in the photo-unit targeted for classification, M denotes the number of images determined to contain any of the event-related items (object categories), and T denotes the predetermined value. The classification result is judged appropriate if the conditional expression is satisfied and not appropriate if the conditional expression is not satisfied.

On judging that the classification result is not appropriate (Step S22: No), the classifying unit 1400 outputs a creation instruction to the classification dictionary creating unit 1500. In response, the classification dictionary creating unit 1500 re-creates the classification dictionary (Step S23). More specifically, the classification dictionary creating unit 1500 uses the event information table T40 with the updated basic event object table to specify a renewed candidate event based on object categories remaining after excluding the object categories used in the previous classification process. Then, the classification dictionary creating unit 1500 creates a new classification dictionary by selecting, out of the event-related items representing the renewed candidate event, one or more event-related items (object categories) having a priority not lower than the predetermined threshold and mutually different similarity attributes.

On the other hand, on judging that the classification result is appropriate (Step S22: Yes), the classifying unit 1400 stores the classification result into the image attribute information storage unit 17 (Step S24).

2.3 Modification

The following describes a modified embodiment according to which a classification dictionary is created recursively.

2.3.1 Structure

Figure 17:
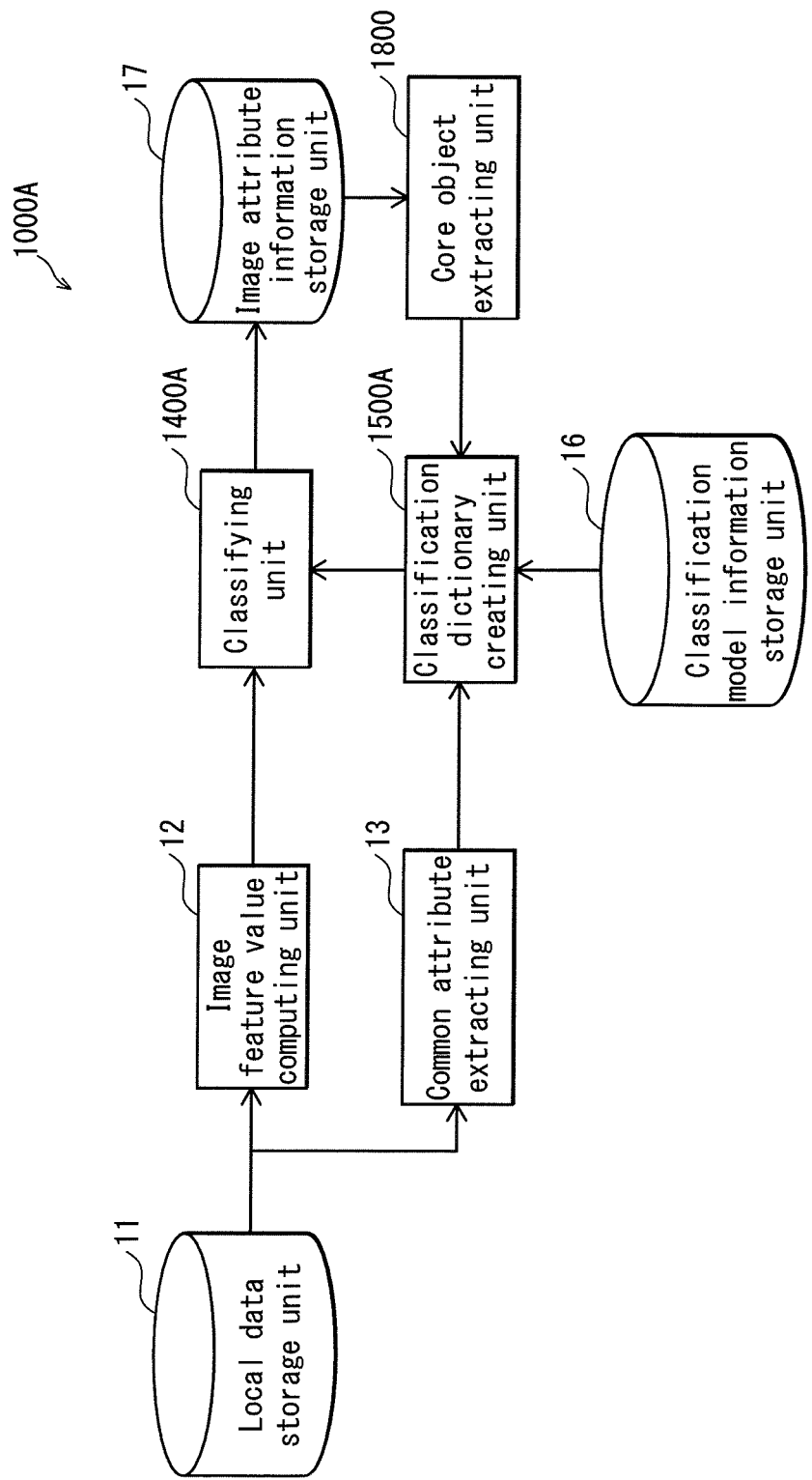
FIG. 17 is a block diagram showing the structure of an image classification device 1000A.

FIG. 17 is a block diagram showing the structure of an image classification device 1000A according to the modification. In FIG. 17, the image classification device 1000A includes a local data storage unit 11, an image feature value computing unit 12, a common attribute extracting unit 13, a classifying unit 1400A, a classification dictionary creating unit 1500A, a classification model information storage unit 16, an image attribute information storage unit 17, and a core object extracting unit 1800.

The local data storage unit 11, image feature value computing unit 12, common attribute extracting unit 13, classification model information storage unit 16, and image attribute information storage unit 17 are the same as those described in Embodiment 1. Thus, a description thereof is omitted.

The following describes the classifying unit 1400A, the classification dictionary creating unit 1500A, and the core object extracting unit 1800.

(1) Core Object Extracting Unit 1800

The core object extracting unit 1800 extracts an object category which is determined to have high reliability based on the classification result by the classifying unit 1400A and which serves as the core for further processing.

More specifically, with the use of the result of classification by the classifying unit 1400A, the core object extracting unit 1800 judges whether an intensive number of images are classified into a particular object category.

On judging that there is a particular object category into which an intensive number of images are classified, the core object extracting unit 1800 specifies that particular object category as the core object and outputs to the classification dictionary creating unit 1500A an instruction to create a classification dictionary based on the thus specified core object.

Suppose, for example, that there are 20 images judged to contain any of a plurality of potential object categories, and that 18 out of the 20 images are detected for one particular object category ("cherry blossoms", for example) out of the plurality of object categories. In this case, the classifying unit 1400A judges that an intensive number of images is classified into a particular object category and thus specifies that particular object category ("cherry blossoms") as the core object.

(2) Classification Dictionary Creating Unit 1500A

In addition to the functionality of the classification dictionary creating unit 1500 described above, the classification dictionary creating unit 1500A has the following functionality.

On receiving the instruction from the core object extracting unit 1800, the classification dictionary creating unit 1500A re-creates a classification dictionary based on the core object specified by the core object extracting unit 1800.

More specifically, with the use of the updated basic event object table and the event information table T40, the classification dictionary creating unit 1500 extracts all events associated with the object category specified as the core object. By extracting one or more potential object categories for classification, the classification dictionary creating unit 1500A creates a new classification dictionary with the thus extracted object categories.

Suppose, for example, that the object category "cherry blossoms" is specified as the core object. In this case, the classification dictionary creating unit 1500 extracts all events associated with "cherry blossoms", namely "cherry blossom viewing", "entrance ceremony", "commencement ceremony", and so on and creates a classification dictionary with the object categories associated with each event extracted.

(3) Classifying Unit 1400A

In addition to the functionality of the classifying unit 1400 described above, the classifying unit 1400A has the functionality of performing classification by using the classification dictionary created by the classification dictionary creating unit 1500 based on the core object.

The classification is carried out in a manner similar to that of Embodiments 1 and 2 and thus a description thereof is omitted.

2.3.2 Operation

Figure 18:
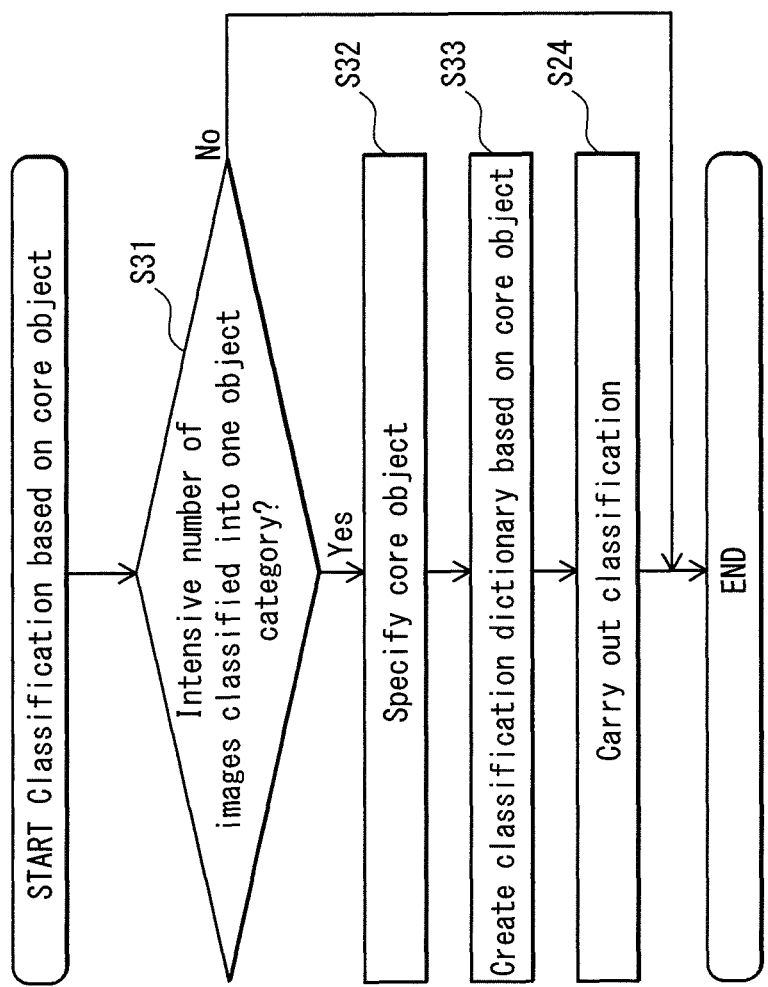
FIG. 18 is a flowchart of a classification process performed based on core objects.

A description is given of the operation of the image classification device 1000A, in particular of the classification performed based on the core object, with reference to the flowchart shown in FIG. 18.

With the use of the result of classification by the classifying unit 1400A, the core object extracting unit 1800 judges whether an intensive number of images are classified into a particular object category (Step S31).

On judging that an intensive number of images are classified into a particular object category (Step S31: Yes), the core object extracting unit 1800 specifies the particular object category as the core object (Step S32).

The classification dictionary creating unit 1500A extracts all events associated with the object category specified as the core object by the core object extracting unit 1800, and extracts from each extracted event one or more object categories for classification and creates a classification dictionary with the thus extracted object categories (Step S33).

The classifying unit 1400A performs classification with the use of the classification dictionary created by the classification dictionary creating unit 1500 based on the core object (Step S34).

On the other hand, on judging that an intensive number of images are not classified into a particular object category (Step S31: No), the image classification device 1000A ends the classification process.

2.4 Effects of Embodiment 2

As described above, unlike a conventional approach of classifying images by using all generic objects as possible objects, the image classification device 1000 and the image classification device 1000A each perform a classification process by using common attributes and by recursively limiting potential object categories to be used for classification. As a consequence, more accurate classification of the user's collection of images, which may include static images and video images, is ensured. Such classification is advantageous for automatically tagging or organizing the images as well as for effective retrieval of an image desired by the user.

3. Embodiment 3

The following describes Embodiment 3 of the present invention, with reference to the accompanying drawings. Embodiment 3 is directed to an arrangement applicable to an image classification device used for organizing a user's collection of images, which may include a large number of static images and video images taken within a local domain, such as user's household. According to the arrangement, attributes common among the collection of images targeted for classification are extracted by using region information acquired from each target image, and then the classification process is performed. As a consequence, objects (physical objects) appearing in respective regions of the images are automatically classified with accuracy. Note that the region information specifies various regions in an image, such as a face region in which a human face is detected, a human region in which a human body is detected, a surrounding region including image regions corresponding to limbs of the detected human body and their surrounding regions, and a background region other than any of the above regions. In the description of Embodiment 3, the same reference signs are used to denote components having the same functionality as the components described in Embodiment 1 or 2. In addition, since the same description is applicable, no further description is given below.

3.1 Structure

Figure 19:
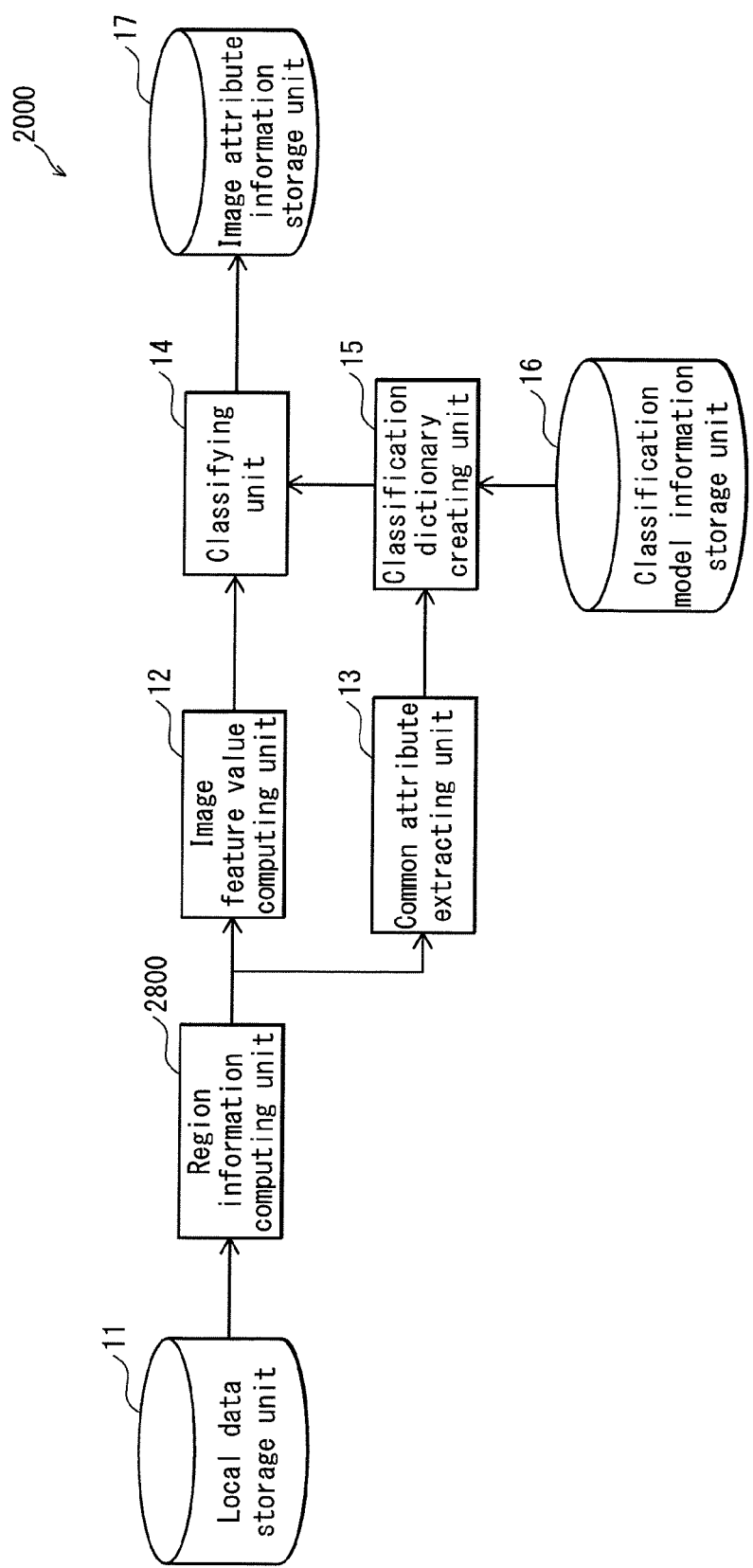
FIG. 19 is a block diagram showing the structure of an image classification device 2000.

FIG. 19 is a block diagram showing the structure of an image classification device 2000 according to Embodiment 3. In FIG. 19, the image classification device 2000 includes a local data storage unit 11, an image feature value computing unit 12, a common attribute extracting unit 13, a classifying unit 14, a classification dictionary creating unit 15, a classification model information storage unit 16, an image attribute information storage unit 17, and a region information computing unit 2800.

The local data storage unit 11, image feature value computing unit 12, common attribute extracting unit 13, classifying unit 14, classification dictionary creating unit 15, classification model information storage unit 16, and image attribute information storage unit 17 are the same as those described in Embodiment 1. Thus, a description thereof is omitted.

(1) Region Information Computing Unit 2800

The region information computing unit 2800 computes, for each of images stored in the local data storage unit 11 and targeted for classification, region information of a specific region of the image.

More specifically, the region information computing unit 2800 computes region information which specifies a face region, a human region, and a background region, by using a known face detection technique and a human detection technique. Details of specific schemes of the face region detection and human region detection are found in Patent Literature (Japanese Patent Application Publication No. 2008-250444) describing a face detection device, which is already put to practical use. As for the details of human detection and a generic object detection, details are found in "Gradient based Feature Extraction—SIFT and HOG—" by Hironobu FUJIYOSHI (Report from and information processing society of Japan, CVIM 160, pp. 211-224, 2007). Note that the region information computing unit 2800 may compute the human region by making estimation based on the human region. Yet, in this embodiment, a human body detector is employed in addition to a face detector to compute the human region.

FIG. 20 is a view showing an example of a result of face region detection and human region detection. FIG. 20 illustrates that face regions G101 and G102 and human regions G201 and G202 of two people are detected. The region information computing unit 2800 computes, as a surrounding region, image regions corresponding to limbs of the detected human body and their surrounding regions and also computes, as a background region, image regions other than any of the above regions.

In this case, the image feature value computing unit 12 computes a separate set of feature values for each region of a target image. In addition, the classification dictionary creating unit 15 in this embodiment has the same functionally as that of Embodiment 1, except that a classification dictionary is created for each region detected.

3.2 Operation

Figure 21:
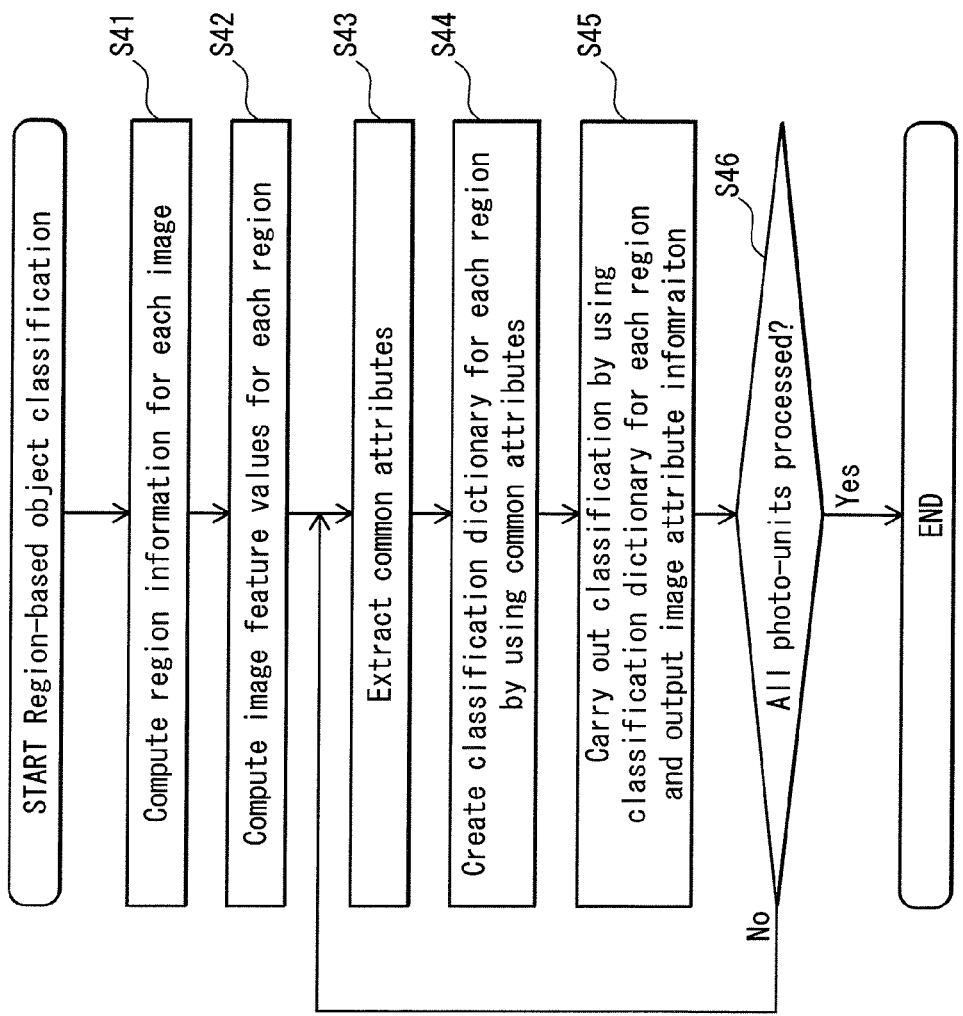
FIG. 21 is a flowchart of a region-based object classification process.

A description is given of the operation of the image classification device 2000, with reference to the flowchart shown in FIG. 21.

Once the classification process starts, the region information computing unit 2800 acquires a plurality of images targeted for classification from the local data storage unit 11 and computes, for each target image, region information indicating at least one image region (Step S41). In the example shown in FIG. 20, the following four types of image regions are detected, which are face regions G101 and G102; human regions G201 and G202, surrounding regions of the human regions G201 and G202, and a background region other than any of the above regions.

Once the region information computing unit 2800 computes region information, the image feature value computing unit 12 computes sets of intra-image feature amounts for the respective regions (Step S42). In this case, the image feature value computing unit 12 computes pieces of information necessary to describe the respective regions indicated by the region information. For example, feature values computed for a face region may be Gabor features which are typical features for a human face. Feature values computed for a human region may be HOG features. Feature values computed for a surrounding region or foreground region may be local features such as SIFT. Feature values computed for a background region may be global features, such as color histogram, color moments, and edge features. The feature values mentioned above may be used in combination. In addition, feature values used for the region detection may be stored and used later in a subsequent process.

Once the image feature value computing unit 12 computes the feature values for the respective regions, the common attribute extracting unit 13 extracts common attributes among the target images (Step S43). This processing step is the same as Step S3 described in Embodiment 1 and thus a detailed description thereof is omitted.

The classification dictionary creating unit 15 creates a classification dictionary for each region indicated by the region information, with the use of the extracted common attributes. This processing is basically the same as Step S4 descried in Embodiment 1, except that the types of potential objects to be used for the classification dictionary are limited according to the region information. For example, with respect to a face region, the classification dictionary is limited to human attributes, such as the attributes of individual people, race, age, family attributes, the presence or absence of glasses or hats. Also, with respect to a human region, the classification dictionary is limited to attributes relating to clothing or to the homogeneity of clothing appearing in multiple images. With respect to a surrounding region, the classification dictionary is limited to attributes relating to artificial objects which are likely to appear in images, depending on the season or whether the picture-taking location is indoors or outdoors. With respect to a background region, the classification dictionary is limited to attributes relating to natural objects which are likely to appear in images, depending on the season or whether the picture-taking location is indoors or outdoors.

Once the classification dictionary creating unit 15 creates separate classification dictionaries for the respective regions, the classification process is performed on the target images (Step S45). This processing step is basically similar to Step S5 of Embodiment 1, except that the classifying unit 14 according to Embodiment 3 performs a search for features matching model information corresponding to any object category included in the classification dictionary, on a region-by-region basis.

The image classification device 2000 judges whether or not the classification process has been completed for all the photo-units (Step S46). On judging that all the photo-units have been processed (Step S46: Yes), the image classification device 2000 ends the entire classification process. On judging that all the photo-units have not yet been processed (Step S46: No), the image classification device 2000 goes back to Step S3.

3.3 Modification

According to Embodiment 3 described above, the region information is computed prior to extraction of image feature values. However, it is not intended to limit the embodiment to such. The region information may be extracted after image feature values are extracted.

3.3.1 Structure

Figure 22:
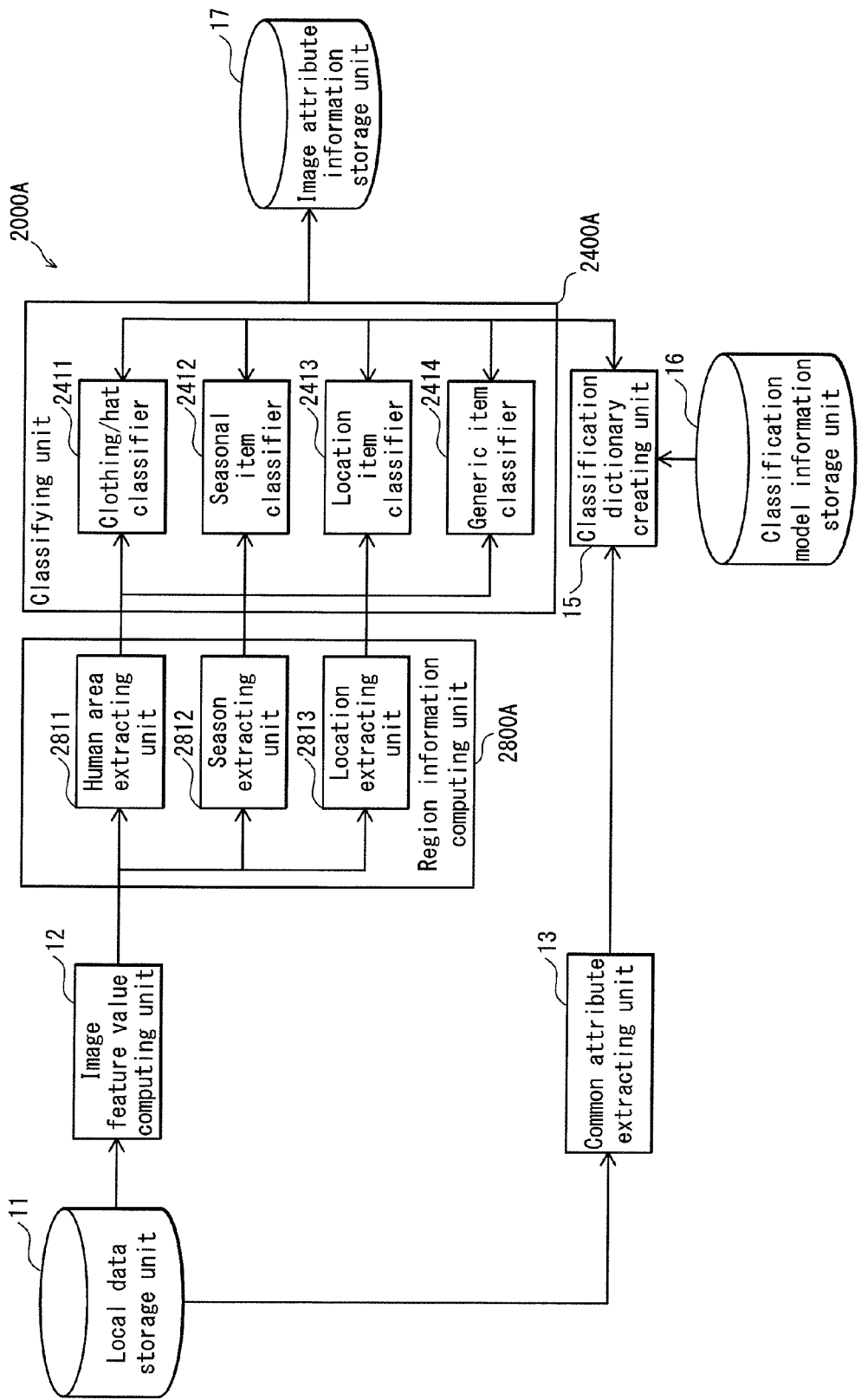
FIG. 22 is a block diagram showing the structure of an image classification device 2000A.

The structure of an image classification device 2000A for this modification is shown in FIG. 22.

FIG. 22 is a block diagram showing the structure of the image classification device 2000A according to the modification. In FIG. 22, the image classification device 2000A includes a local data storage unit 11, an image feature value computing unit 12, a common attribute extracting unit 13, a classifying unit 2400A, a classification dictionary creating unit 15, a classification model information storage unit 16, an image attribute information storage unit 17, and a region information computing unit 2800A.

The local data storage unit 11, image feature value computing unit 12, common attribute extracting unit 13, classification dictionary creating unit 15, classification model information storage unit 16, and image attribute information storage unit 17 are the same as those described in Embodiment 3. Thus, a description thereof is omitted.

(1) Region Information Computing Unit 2800A

For each target image stored in the local data storage unit 11, the region information computing unit 2800A computes region information using the feature values computed by the image feature value computing unit 12.

More specifically, the region information computing unit 2800A includes a human area extractor 2811, a season extractor 2812, and a location extractor 2813, as shown in FIG. 22.

The human area extractor 2811 specifies a face region, a human region, and a surrounding region, based on the feature values computed by the image feature value computing unit 12.

The season extractor 2812 specifies regions other than the regions specified by the human area extractor 2811. That is, the season extractor 2812 specifies background regions. The season extractor 2812 extracts an image region corresponding to a physical object representing a specific season (such as, cherry blossoms or Hina-doll) from the background region that is specified by using the feature values computed by the image feature value computing unit 12.

The location extractor 2813 extracts an image region corresponding to a physical object indicating whether the image-capturing location is indoors or outdoors (such as, building or interior goods, such as a sofa) from the background region.

(2) Classifying Unit 2400A

As shown in FIG. 22, the classifying unit 2400A includes a clothing/hat classifier 2411, a seasonal item classifier 2412, a location item classifier 2413, and a generic item classifier 2414.

The clothing/hat classifier 2411 performs a classification process on each human area (face region, and human region) with respect to the limited attributes, including human-related attributes (such as the presence or absence of eyeglasses, hats, caps, and the like), the homogeneity of clothing appearing in multiple images, and so on.

The seasonal item classifier 2412 performs a classification process with respect to the limited attributes, including artificial or natural objects representing a specific season.

The location item classifier 2413 performs a classification process with respect to the limited attributes, including artificial or natural photographic object suggesting the location (indoors or outdoors).

The generic item classifier 2414 performs a classification process with respect to the limited attributes, including the attributes of a specific person, race, age, or family.

3.3.2 Operation

The operation of the image classification device 2000A is not described here, because the same description is applicable provided that Steps S41 and S42 shown in FIG. 21 are switched.

3.4 Effects of Embodiment 3

As described above, instead of classifying images by using all generic objects as possible objects, a classification process is performed on a region-by-region basis using pieces of model information limited specifically for the respective regions with reference to common attributes extracted from the user's collection of images. As a consequence, more accurate classification of the user's collection of images, which may include static images and video images, is ensured. Such classification is advantageous for automatically tagging or organizing the images as well as for effective retrieval of an image desired by the user.

4. Embodiment 4

The following describes Embodiment 4 of the present invention, with reference to the accompanying drawings. Embodiment 4 of the present invention is directed to an arrangement applicable to an image classification device used for organizing a user's collection of images, which may include a large number of static images and video images taken within a local domain, such as user's household. According to the arrangement, the user registers a potential object together with a common attribute related to the potential object. As a consequence, even with respect to a newly registered potential object, the common attributes registered in advance are usable to automatically and accurately classify photographic objects appearing in respective regions of the images. In the description of Embodiment 4, the same reference signs are used to denote components having the same functionality as the components described in Embodiments 1, 2, and 3. In addition, since the same description is applicable, no further description is given below.

4.1 Structure

Figure 23:
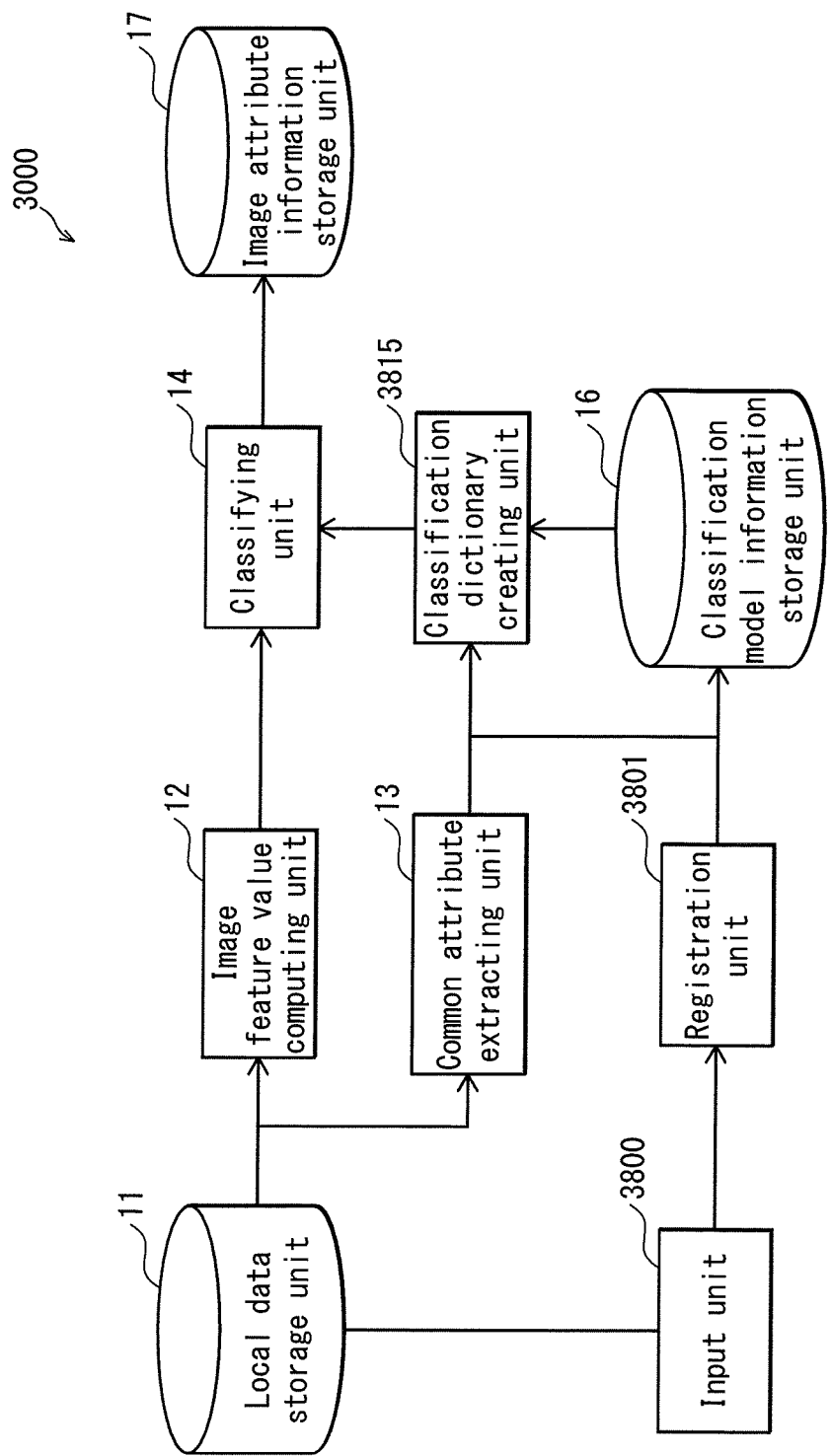
FIG. 23 is a block diagram showing the structure of an image classification device 3000.

FIG. 23 is a block diagram showing the structure of an image classification device 3000 according to Embodiment 4. In FIG. 23, the image classification device 3000 includes a local data storage unit 11, an image feature value computing unit 12, a common attribute extracting unit 13, a classifying unit 14, a classification dictionary creating unit 3815, a classification model information storage unit 16, an image attribute information storage unit 17, an input unit 3800, and a registration unit 3801. The local data storage unit 11, image feature value computing unit 12, common attribute extracting unit 13, classifying unit 14, classification model information storage unit 16, and image attribute information storage unit 17 are the same as those described in Embodiment 1. Thus, a description thereof is omitted.

(1) Input Unit 3800

The input unit 3800 receives a user operation for conducting a registration process on the local data stored on the local data storage unit 11.

For example, the input unit 3800 receives input for tagging images targeted for classification and also receives input for registering an object appearing in the target images as being associated with a specific object category. Note that input is made on a touch panel display, with a mouse or keyboard, or on a remote control, for example.

(2) Registration Unit 3801

The registration unit 3801 performs a tagging process or a registration process according to input received by the input unit 3800.

The registration unit 3801 extracts common attributes from images on which the tagging or registration process is conducted or from images relevant to the processed images, and stores the thus extracted common attributes in the classification model information storage unit 16 in association with an object category name intended to be registered.

(3) Classification Dictionary Creating Unit 3815

In addition to the functionality described in Embodiment 1 above, the classification dictionary creating unit 3815 has the following functionality.

When the common attribute extracting unit 13 extracts a common attribute and there is an object category name associated with the thus extracted common attribute, the classification dictionary creating unit 3815 adds the object category to the classification dictionary.

4.2 Operation

Figure 24:
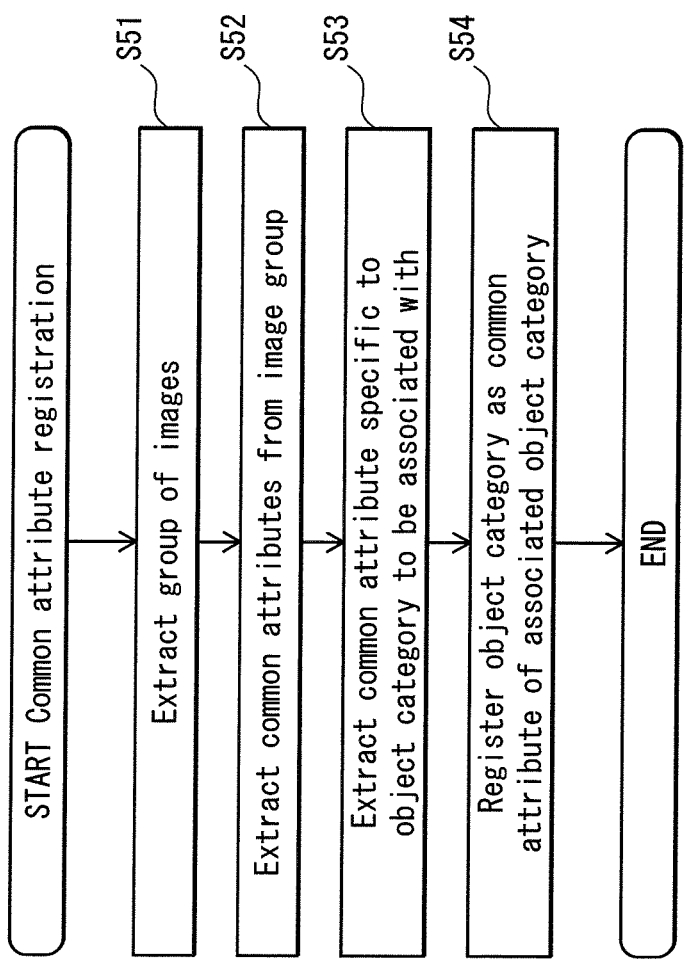
FIG. 24 is a flowchart of a common attribute registration process.

The following describes the operation of the registration unit 3801, with reference to the flowchart shown in FIG. 24. Note that the classification process performed on target images is the same as that described in Embodiment 1 (see FIGS. 13 and 14). Therefore, no redundant description is given here.

Once the tagging process or registration process starts according to a user instruction, the input unit 3800 receives input for the corresponding process. The registration unit 3801 performs the process and extracts images to be targeted for the common attribute extraction (Step S51). For example, the registration unit 3801 extracts images to be targeted for the common feature extraction, by simply selecting images associated with the tags specified by the user, such as "my pet", "fireworks display", "chestnut-gathering", "Christmas", or "birthday party", by selecting images relevant to the initially selected images, or by selecting a series of images taken within a specific time span.

From the thus extracted target images, the registration unit 3801 extracts common attributes in the same manner as the common attribute extracting unit 13 described in Embodiment 1 (Step S52).

After extracting common attributes from the images, the registration unit 3801 extracts specific common attributes associated with an object category intended to be registered (Step S43). The common features are extracted out of the attributes organized in the same manner as, for example, those shown in FIG. 9 and available for common feature extraction. More specifically, image metadata information as shown in FIG. 5 is extracted from each target image, and the thus extracted pieces of image metadata information are abstracted with respect to a specific item and then subjected to the common attribute extraction. For example, common information is extracted by converting the time information into information indicating a time span, such as a season, the location information into landmark information (location information) indicating an amusement park, or human information frequently appearing in images into human object information.

Then, the registration unit 3801 stores the extracted common attributes into the classification model information storage unit 16, as the common attributes associated with the object category to be registered (Step S44).

4.3 Effects of Embodiment 4

In the above manner, object categories are registered in advance along with common attributes associated with the object categories. When new images are classified or when already stored images are classified again, the classification process is carried out by using potential object categories appropriately limited based on the common attributes registered in advance as being associated with the corresponding object categories. Consequently, the images are classified to more closely reflect user's intention.

In addition, instead of classifying images by using all generic objects as possible objects, a classification process of the user's collection of images is performed using limited object categories having been registered by the user. This is made possible by registering a new object category to be used for image classification, as being associated with appropriate common attributes. As a consequence, more accurate classification of the user's collection of images, which may include static images and video images, is ensured. Such classification is advantageous for automatically tagging or organizing the images as well as for effective retrieval of an image desired by the user.

5. Embodiment 5

The following describes Embodiment 5 of the present invention, with reference to the accompanying drawings. According to Embodiment 1, all the components are included in one device. According to Embodiment 5, however, some of the components are included in an external device connected over a network. In the description of Embodiment 5, the same reference signs are used to denote components having the same functionality as the components described in Embodiment 1. In addition, since the same description is applicable, no further description is given below.

5.1 Configuration of Image Classification System 4000

Figure 25:
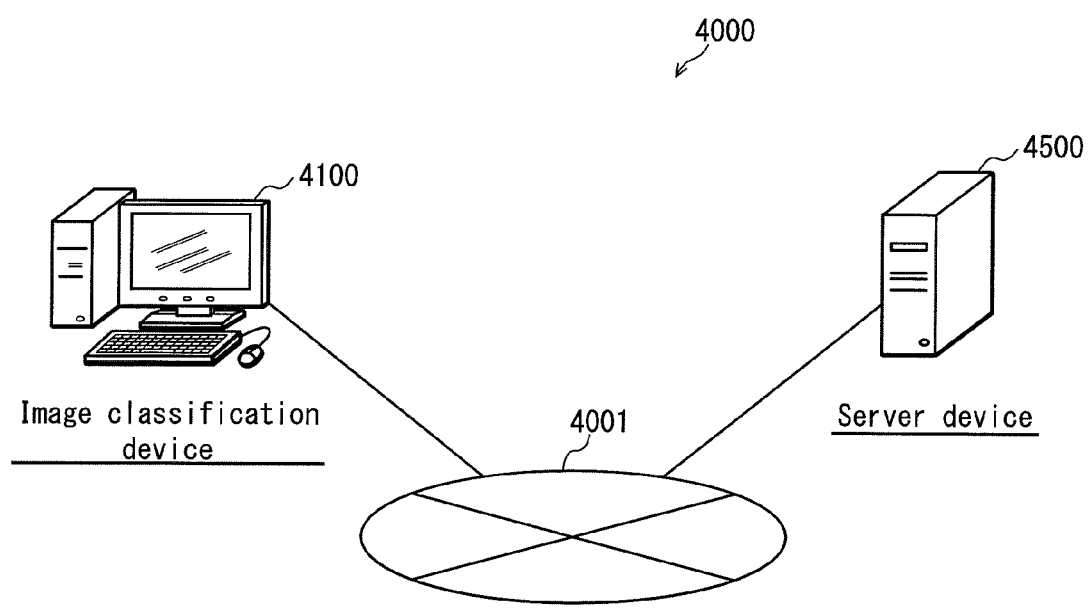
FIG. 25 is a view showing the structure of an image classification system 4000.

As shown in FIG. 25, an image classification system 4000 includes an image classification device 4100 and a server device 4500, which are connected over a network 4001 typified by the Internet, for example.

The following now describes the structure of the image classification device 4100 and the server device 4500.

(1) Classifying Unit 4100

Figure 26:
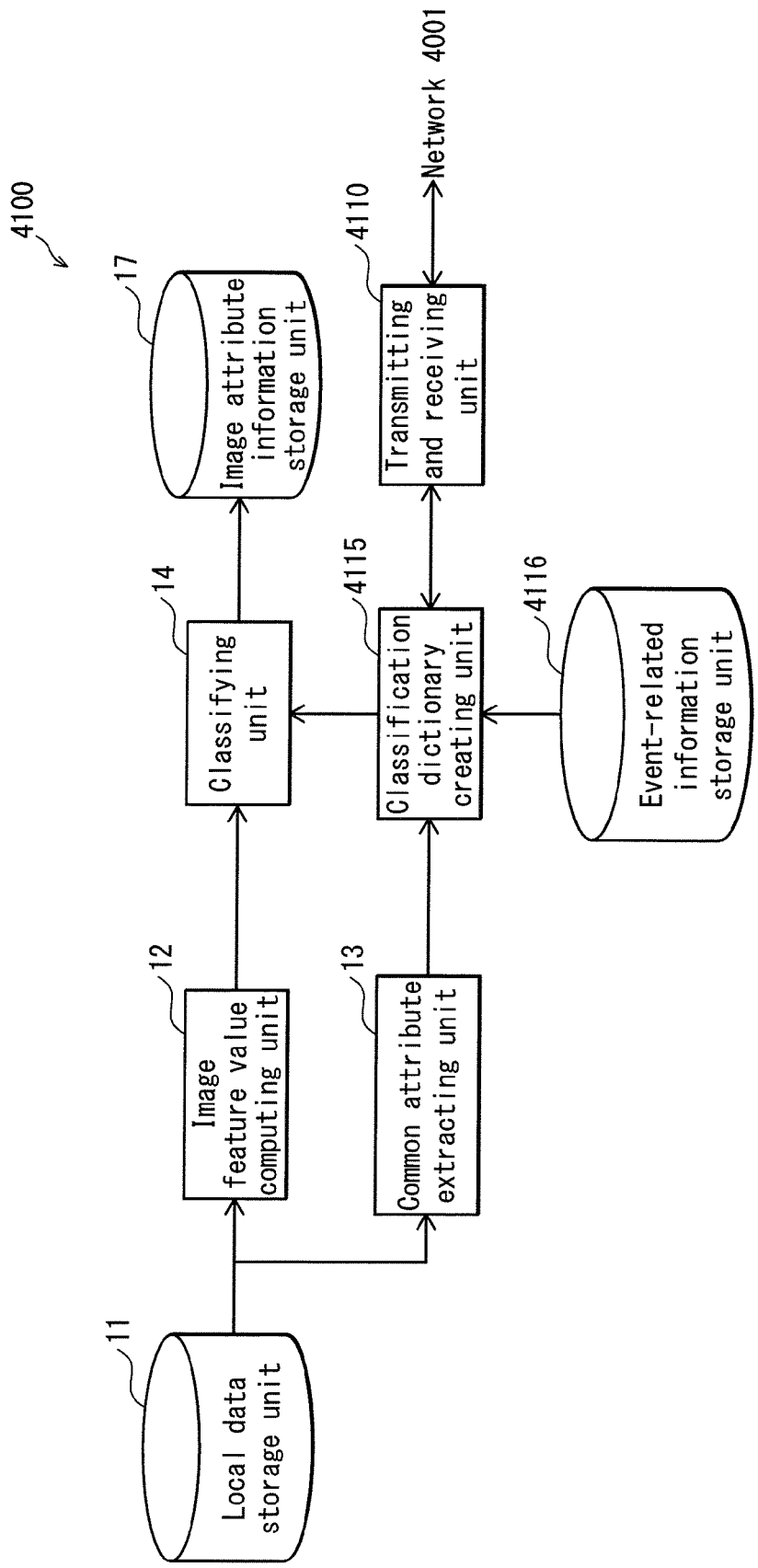
FIG. 26 is a block diagram showing the structure of an image classification device 4100.

As shown in FIG. 26, the image classification device 4100 includes a local data storage unit 11, an image feature value computing unit 12, a common attribute extracting unit 13, a classifying unit 14, an image attribute information storage unit 17, a classification dictionary creating unit 4115, an event-related information storage unit 4116, and a transmitting and receiving unit 4110.

The local data storage unit 11, image feature value computing unit 12, common attribute extracting unit 13, classifying unit 14, and image attribute information storage unit 17 are the same as those described in Embodiment 1. Thus, a description thereof is omitted.

(1-1) Event-Related Information Storage Unit 4116

The event-related information storage unit 4116 stores a basic event object table T20, an attribute table T30, and an event information table T40 described in Embodiment 1.

The basic event object table T20, attribute table T30, and event information table T40 have been already described in Embodiment 1. Thus, the description is not repeated here.

(1-2) Classification Dictionary Creating Unit 4115

Similarly to the classification dictionary creating unit 15 described in Embodiment 1, the classification dictionary creating unit 4115 creates a classification dictionary by selecting, out of the event-related items representing the specified candidate event, one or more event-related items (object categories) having a priority not lower than a predetermined threshold and mutually different similarity attributes.

The difference with Embodiment 1 is in that the classification dictionary creating unit 4115 issues a request for model information matching the thus crated classification dictionary to the server device 4500.

More specifically, the classification dictionary creating unit 4115 creates request information requesting appropriate model information and transmits the request information to the server device 4500 via the transmitting and receiving unit 4110. The request information created herein includes identification information (names or identifiers, for example) of all object categories included in the thus crated classification dictionary.

In response, the classification dictionary creating unit 4115 receives pieces of model information associated with the object categories included in the created classification dictionary, from the server device 4500 via the transmitting and receiving unit 4110. The classification dictionary creating unit 4115 outputs to the classifying unit 14 the pieces of model information associated with the object categories included in the created classification dictionary.

The classifying unit 14 classifies images based on: the pieces of model information associated with the object categories included in the classification dictionary created by the classification dictionary creating unit 4115; and the image feature values computed by the image feature value computing unit 12.

(1-3) Transmitting and Receiving Unit 4110

On receiving request information from the classification dictionary creating unit 4115, the transmitting and receiving unit 4110 transmits the request information to the server device 4500 over the network 4001.

The transmitting and receiving unit 4110 receives, from server device 4500 over the network 4001, pieces of model information associated with the object categories indicated in the classification dictionary created by the classification dictionary creating unit 4115. Upon receipt, the transmitting and receiving unit 4110 outputs the received pieces of model information to the classification dictionary creating unit 4115.

(2) Server Device 4500

Figure 27:
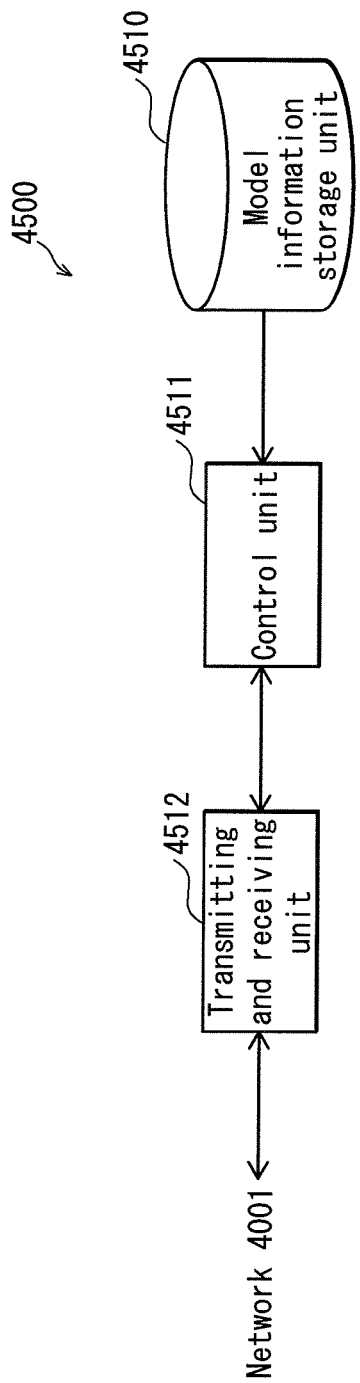
FIG. 27 is a block diagram showing the structure of a server device 4500.

As shown in FIG. 27, the server device 4500 includes a model information storage unit 4510, a control unit 4511, and a transmitting and receiving unit 4512.

(2-1) Model Information Storage Unit 4510

The model information storage unit 4510 stores a table T10. As described in Embodiment 1, the table T10 stores pieces of model information each of which shows feature values of a corresponding object category.

Note that the description of the table T10 has been already given in Embodiment 1. Thus, the same description is not repeated here.

(2-2) Control Unit 4511

The control unit 4511 receives request information transmitted from the image classification device 4100 via the transmitting and receiving unit 4512.

With reference to the received request information, in particular to information identifying the object categories included in the classification dictionary created by the image classification device 4100, the control unit 4511 retrieves pieces of model information corresponding to the identified object categories from the table T10 stored in the model information storage unit 4510.

The control unit 4511 associates each piece of model information with a corresponding object category included in the classification dictionary created by the image classification device 4100 and transmits the resulting data to the image classification device 4100 via the transmitting and receiving unit 4512.

(2-3) Transmitting and Receiving Unit 4512

On receiving request information from the image classification device 4100 over the network 4001, the transmitting and receiving unit 4512 outputs the received request information to the control unit 4511.

The transmitting and receiving unit 4512 receives from the control unit 4511 pieces of model information associated with the corresponding object categories included in the classification dictionary created by the classification dictionary creating unit 4115 and transmits the received model information to the image classification device 4100 over the network 4001.

5.2 Operation of Image Classification System 4000

The description of the operation of the image classification system 4000 is given by describing the operation of the image classification device 4100 and of the server device 4500.

(1) Operation of Image Classification Device 4100

The operation of the image classification device 4100 is described with reference to the flowchart shown in FIG. 13, with the focus on the difference between Embodiment 1 and Embodiment 5.

The image classification device 4100 performs a classification process shown in FIG. 13 with two additional steps between Steps S4 and S5.

In the first additional step, the classification dictionary creating unit 4115 creates request information and transmits the request information to the server device 4500 via the transmitting and receiving unit 4110 (hereinafter, Step S100).

In the second additional step performed subsequently to Step S100, the classification dictionary creating unit 4115 receives from the server device 4500 pieces of model information associated with the object categories included in the classification dictionary created by the classification dictionary creating unit 4115 (hereinafter, Step S101).

Subsequently to Steps S100 and S101, Step S5 is executed, so that images are classified.

(2) Operation of Server Device 4500

Figure 28:
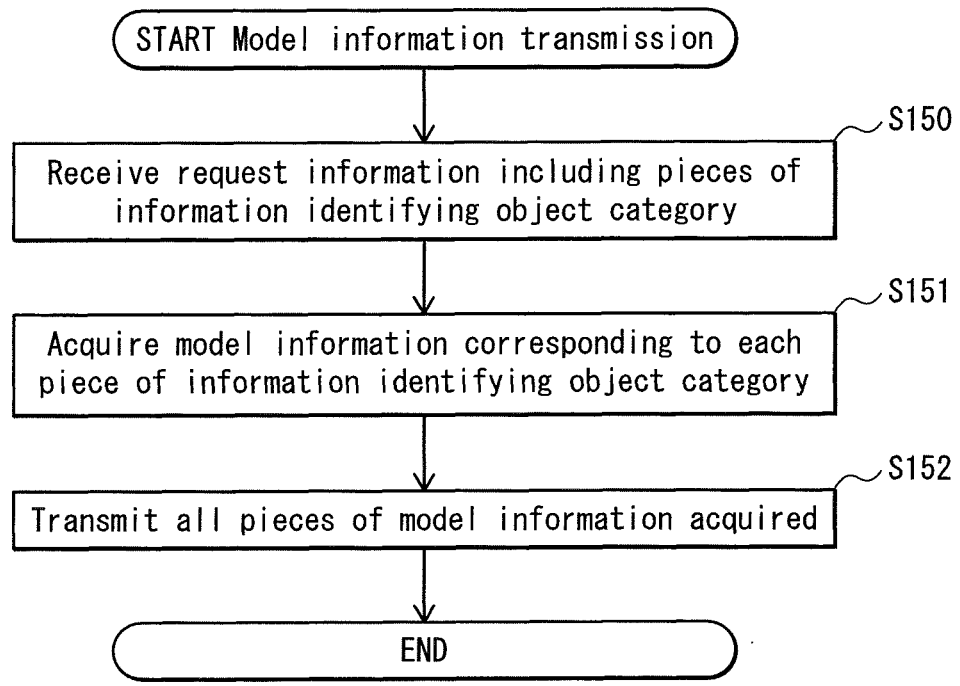
FIG. 28 is a flowchart of a model information transmission process.

The following describes the operation of the server device 4500, with reference to the flowchart shown in FIG. 28.

The control unit 4511 of the server device 4500 receives request information transmitted from the image classification device 4100 over the network 4001 (Step S150).

With dereference to the request information, in particular to information identifying the object categories, the control unit 4511 retrieves corresponding pieces of model information from the table T10 stored in the model information storage unit 4510 (Step S151).

The control unit 4511 associates each pieces of model information with a corresponding object category identified by the received request information and transmits the resulting data to the image classification device 4100 over the network 4001 (Step S152).

5.3 Modification

Embodiment 5 described above is directed to the image classification system 4000 in which model information is stored in an external device (i.e., the server device 4500). However, the system configuration is not limited to such.

In one modified system, for example, images targeted for classification may be stored in an external device.

An image classification system 4000A according to such a modification is described below. In the description of this modification, the same reference signs are used to denote components having the same functionality as the components described in other embodiments. In addition, since the same description is applicable, no further description is given below.

(1) Configuration of Image Classification System 4000A

Figure 29:
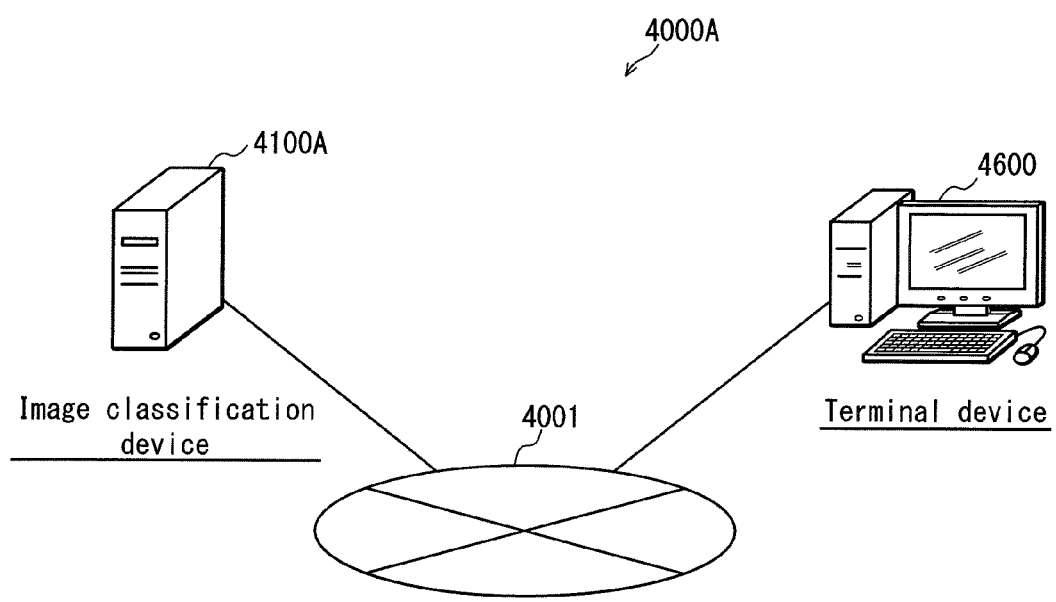
FIG. 29 is a view showing the structure of an image classification system 4000A.
Figure 30:
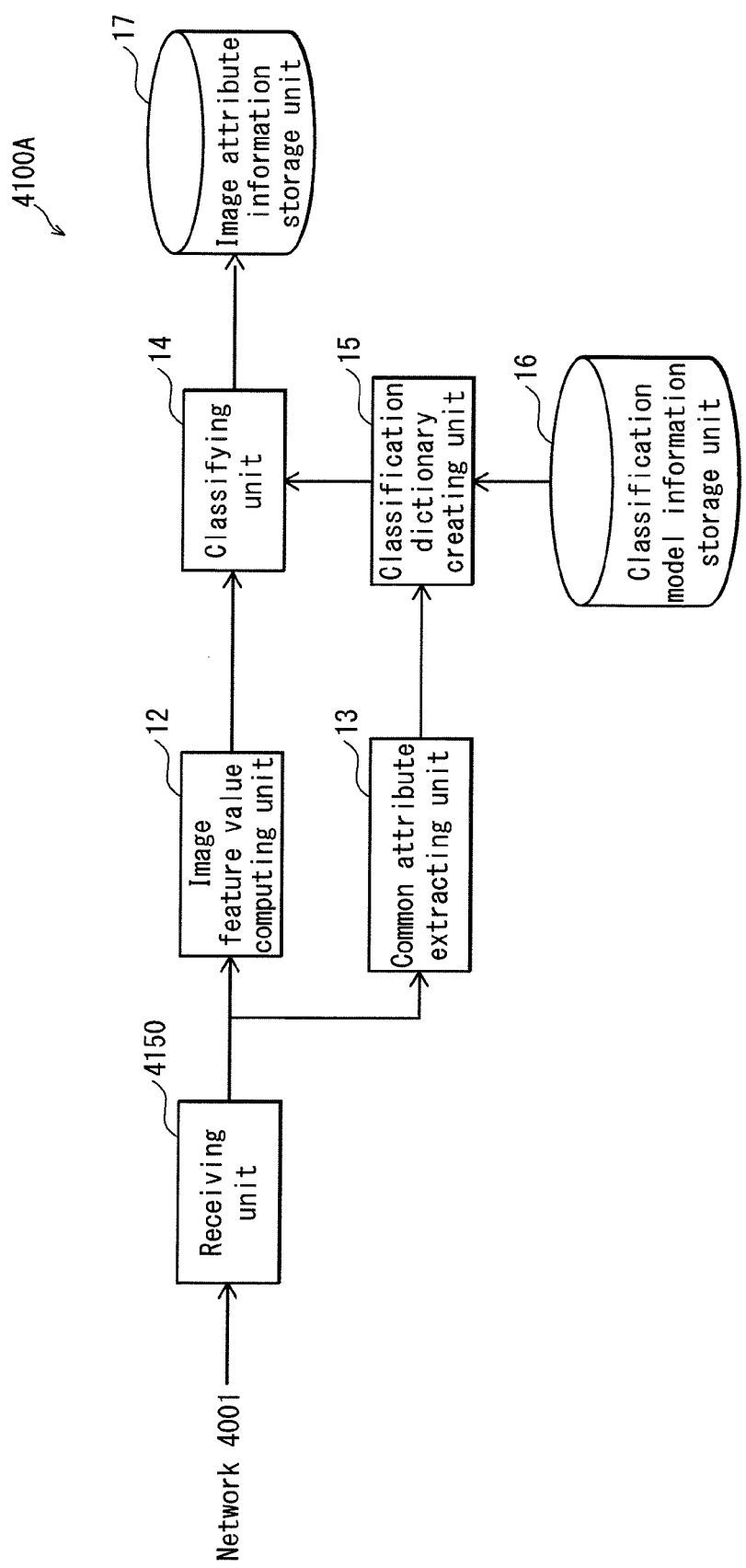
FIG. 30 is a block diagram showing the structure of an image classification device 4100A.

As shown in FIG. 29, the image classification system 4000A includes an image classification device 4100A and a terminal device 4600, which are connected over a network 4001 typified by the Internet, for example.

The following now describes the structure of the image classification device 4100A and the terminal device 4600.

(1-1) Image Classification Device 4100A

As shown in FIG. 26, the image classification device 4100A includes an image feature value computing unit 12, a common attribute extracting unit 13, a classifying unit 14, a classification dictionary creating unit 15, a classification model information storage unit 16, an image attribute information storage unit 17, and a receiving unit 4150.

The image feature value computing unit 12, common attribute extracting unit 13, classifying unit 14, classification dictionary creating unit 15, classification model information storage unit 16, and image attribute information storage unit 17 are the same as those described in Embodiment 1. Thus, a description thereof is omitted.

The receiving unit 4150 receives one or more images targeted for classification and metadata information of each target image from the terminal device 4600 over the network 4001. Upon receipt, the receiving unit 4150 outputs the received images and metadata information to the image feature value computing unit 12 and the common attribute extracting unit 13.

The image feature value computing unit 12 computes feature values for each target image received from the receiving unit 4150. The common attribute extracting unit 13 extracts common attributes using the target images and metadata information received from the receiving unit 4150.

(1-2) Terminal Device 4600

Figure 31:
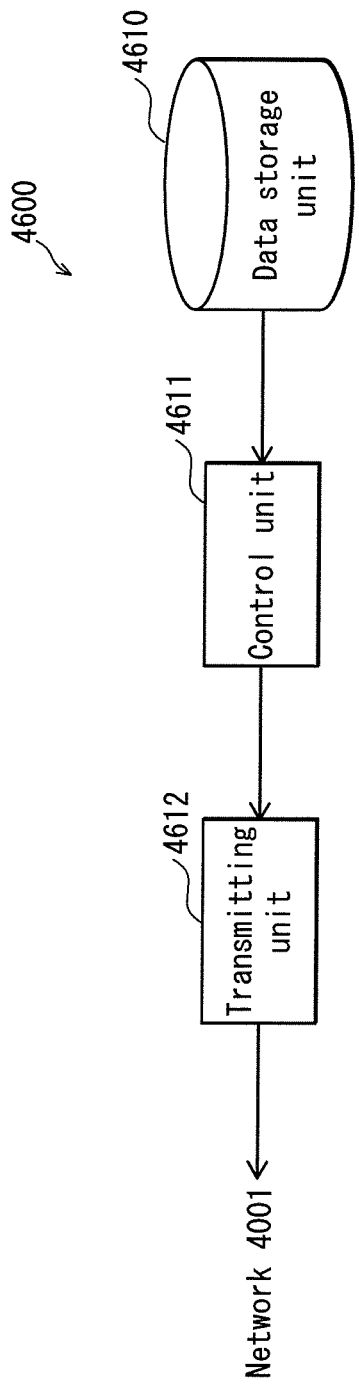
FIG. 31 is a block diagram showing the structure of a terminal device 4600.

As shown in FIG. 31, the terminal device 4600 includes a data storage unit 4610, a control unit 4611, and a transmitting unit 4612.

The data storage unit 4610 is the same as the local data storage unit 11 described in Embodiment 1. Thus, the description is not repeated here.

According to user operations, the control unit 4611 acquires metadata information for each of one or more target images stored in the local data storage unit 11 and transmits the acquired metadata information to the image classification device 4100A via the transmitting unit 4612.

The transmitting unit 4612 transmits the images and metadata information received from the control unit 4611 to the image classification device 4100A over the network 4001.

(2) Operation

The following describes the operation of the image classification system 4000A, in particular of the image classification device 4100A, with the focus on the difference with Embodiment 1.

The image classification device 4100A performs a classification process shown in FIG. 13 with an additional step performed prior to Step S1. In the additional step, the receiving unit 4150 receives, from the terminal device 4600, one or more images targeted for classification along with metadata information of each target image.

With this arrangement, the image classification device 4100A can perform a classification process on the images received from the external device (i.e., the terminal device 4600).

(3) Others

According to this embodiment, the terminal device 4600 is any device capable of storing images and establishing network connection. Examples of the terminal device 4600 include a personal computer, digital camera, and digital video camera.

Furthermore, the image classification device 1 described in Embodiment 1 may be modified by adding the functionality to receive images from an external device as described in this modification. The image classification device 1 modified as above can classify images stored in an external device as well as images locally stored.

In addition, images acquired from an external device are not limited to those photographed by the user requesting the image classification. For example, images photographed by a friend may be acquired over a social network. In this case, photo-units may be formed to include both images photographed by the user and images photographed by a friend. Alternatively, photo-units may be formed exclusively of images photographed by a friend.

6. Modifications

Up to this point, the present invention has been described by way of various embodiments but the present invention is not limited to those specific embodiments. Various other modifications including the following are possible.

(1) In each of the embodiments described above, each event-related item corresponding to a specific event may be of any king of item as long as the item is likely to be photographed in the event. It may be applicable to assign weights to priorities according to the relevance levels, in advance. Alternatively, it is applicable to compute separate priorities for an even and an object category and assign weights to the computed properties. Then, combined priority may be computed by adding the weighted event priority to the weighted object category priority. Then, the object categories used for classification may be determined based on the combined priorities.

(2) In Embodiment 2 described above, the predetermined value T in the conditional expression is described as a fixed value. However, this is merely an example and without limitation.

The value used in the conditional expression may be modified according to the number of images included in the photo-unit or depending on the kind of physical object used for classification as a potential object.

It is also applicable to set in advance the occurrence provability of each object category in a specific event. Then, whether or not the classification result is appropriate can be judged depending on whether any image is classified into an object having a certain level of occurrence provability.

In addition, it is applicable to judge the classification result as being inappropriate, if one object category is judged to be contained in all mages or multiple object categories are judged to be contained in one image.

(3) According to Embodiment 2 described above, there is a possibility that the same object category as previously extracted is extracted again for a renewed candidate event. It is applicable to include or exclude any previously extracted object category from object categories to be extracted for a renewed candidate.

In the case of excluding previously extracted object categories, the classification dictionary may be created by extracting object categories in a decreasing order of priorities up to a certain level of priority or up to a predetermined number of object categories, from the object categories remaining after excluding the object categories used in the previous classification.

In the case where images end up being classified into too many object categories, the objects used in the classification process may be further limited to those having higher priorities and the classification dictionary may be created based on the further limited photographic objects. In this modification, the same candidate event used in the previous classification is used again.

(4) According to Embodiment 3 described above, the region information computing unit 2800 is described to include a face detector and a human body detector. However, this is merely an example and without limitation.

The region information computing unit 2800 may additionally include an animal detector. With this arrangement, the region information computing unit 2800 is enabled to compute region information indicating an animal region in which an image of animal is detected and a background region that is an image region other than the animal image region. Furthermore, region information computing unit 2800 may include a detector employing a different detecting scheme, so that region information may be computed to indicate a region of interest or attention and a background region that is an image region other than the region of interest.

(5) According to each embodiment described above, the classification dictionary creating unit creates a classification dictionary by specifying one candidate event out of a plurality of events. However, this is merely an example and without limitation.

In the case where the common attributes represent a season, location or event context (such as Hina-doll or carp streamer), the classification dictionary creating unit may exclusively extract object categories having a mach with the season, location, or event context to create a classification dictionary based on the thus extracted object categories.

(6) According to each embodiment described above, a common attribute is associated with an event indirectly specified based on an object category included in the event. However, this is merely an example and without limitation.

That is, a common attribute may be directly associated with an event.

(7) The family-structure information and human information described in the above embodiments may include information indicating time-varying change of the human face or body. Suppose, for example, that images are photographed at a specific annual event. With the provision of information indicating time-varying change, a person appearing in one image is more accurately identified as the same person appearing in another image. As a consequence, each occurrence of the event is collectively specified as one event rather than separate events.

(8) According to each embodiment described above, the classifying unit performs a classification process based on the feature values of the entire image region of each image. However, this is merely an example and without limitation.

Alternatively, the images may be classified in consideration of diversity of potential objects.

In such a modification, the classification model information storage unit stores a table T100 shown in FIG. 32, in place of the table T10.

The table T100 has a storage area for storing a plurality of records each having the fields for an object category name, model information, and diversity information. For example, a record with the object category name "cherry blossoms" contains the feature values representing an image of cherry blossoms and also contains diversity information.

The object category name and model information have been already described in Embodiment 1 and the description thereof is omitted here.

The diversity information indicates whether the diversity level of a corresponding object is high or low. The term "diversity" used herein refers to the number of possible combinations of the corresponding object and a background. The diversity information indicating "high" means that a relatively large number of combinations are possible for the corresponding object and a background. On the other hand, the diversity information indicating "low" means that the number of possible combinations is relatively limited. For example, for the object "airplane", the background possibly appears with the object in one image is relatively limited to "sky" or "ground (runway)". The object "airplane "seldom appears with other backgrounds. Therefore, the diversity information for the object "airplane" is "low". On the other hand, in the case of the object "potted plant", since a potted plant may be located at various places including "window", "road", "house (entrance)", "garden", all of such locations are considered as possible backgrounds. That is, there are various possible combinations of "potted plant" and "background", so that the diversity information for the object "potted plant" is "high".

The classifying unit retrieves from the table T100 the diversity information for the object corresponding to model information used for image classification. In the case where the retrieved piece of diversity information indicates "low", the classifying unit performs a classification process based on the feature values of the entire image region. On the other hand, in the case where the retrieved piece of diversity information indicates "high", the classifying unit specifies a region of interest (hereinafter ROI) and performs a classification process using the model information relevant to the thus specified region. Since the specification of ROI is known in the art, no description thereof is given here.

In the above modification, an object having high diversity (such as potted plant) is classified by specifying a region excluding the background (i.e., by specifying region containing the potted plant only). This ensures more accurate classification. Note that an image region of an object having high diversity (object subjected to classification) is specified by the scheme of ROI. However, this scheme is merely one example and without limitation. Any scheme may be usable as long as an image region of an object subjected to classification is specified.

(9) According to Embodiment 5 described above, the processes related to image classification, more specifically, the process performed by the image feature value computing unit 12, the common attribute extracting unit 13, the classification dictionary creating unit 4115, and the classifying unit 14 are all part of the processing handled by the image classification device 4100. However, this is merely an example and without limitation.

At least one of the processes by the image feature value computing unit 12, the common attribute extracting unit 13, the classification dictionary creating unit 4115, and the classifying unit 14 may be handled by the server device 4500.

(10) A program describing the processing steps described in the above embodiment may be stored in memory, and a CPU (Central Processing Unit) or the like may read the program from the memory and execute the program to realize the processing steps described above.

Furthermore, the program describing the processing steps may be stored on a recording medium and distributed.

(11) The components relevant to the above embodiments may be implemented as LSI (Large Scale Integration) which is an integrated circuit. Each of these components may be separately implemented as a single chip. Alternatively, some or all of these components may be implemented as a single chip. Furthermore, although the integrated circuit is specifically referred to as LSI, the circuit may be referred to as IC (Integrated Circuit), system LSI, super LSI, or ultra LSI, depending on the packaging density. In addition, the scheme employed to realize an integrated circuit is not limited to LSI and such an integrated circuit may be realized by a dedicated circuit or by a general-purpose processor. Furthermore, it is applicable to use an FPGA (Field Programmable Gate Array) that enables post-manufacturing programming of an LSI circuit or a reconfigurable processor that enables reconfiguration of connection between circuit cells within an LSI circuit and their settings. Alternatively, the computation by these functional blocks may be carried out with the use of DSP (Digital Signal Processor) or CPU (Central Processing Unit). Furthermore, these processing steps are described in a program and recorded on a recording medium. By executing the program, the processing steps are realized.

When any new circuit integration technology becomes available or derived as the semiconductor technology advances, such new technology may be employed to integrate the functional blocks. One possibility lies in adapting biotechnology.

(12) The embodiments and modifications described above may be combined.

7. Supplemental (1) According to one aspect of the present invention, an image processing device includes: an attribute storage unit that stores a photographic attribute for each of a plurality of events, each photographic attribute indicating a photographic condition predicted to be met with respect to an image photographed in the corresponding event; an object information storage unit that stores, for each event, an object predicted to appear in an image photographed in the corresponding event; an extracting unit that extracts from a collection of photographed images a photographic attribute that is common among a predetermined number of photographed images in the collection, based on pieces of photography-related information of the respective photographed images; a specifying unit that specifies an object stored, in the object information storage unit, for an event corresponding to the extracted photographic attribute; and an associating unit that conducts a process on the collection of photographed images to associate each photographed image containing the specified object with the object.

With this configuration, the image processing device performs a process for associating target images with objects after specifying potential objects that are likely to appear in images photographed at a specific event associated with the photographic attributes of the target images. This eliminates the need for the user to specify potential objects to be used for the association process, reducing the user's trouble required for the association process. In addition, the image processing device limits the potential objects to be used for the classification to those associated with the event that is in turn associated with the extracted photographic attribute. Consequently, the classification is ensured to be accurate.

(2) Optionally, the extracting unit may divide the collection of photographed images into one or more groups based on the pieces of photography-related information of the respective photographed images and may extract one or more photographic attributes common among the photographed images within each group.

With this configuration, the image processing device divides the collection of photographed images into one or more groups, and common photographic attributes are extracted on a group-by-group basis. Consequently, the extraction of common photographic attributes is carried out accurately.

(3) Optionally, each piece of photography-related information may include at least one of the following information items: time information indicating a time at which a corresponding image was photographed; location information indicating a location at which the corresponding image was photographed; human information regarding a person appearing in the corresponding image; photo-taking information indicating a photographing method used to photograph the corresponding image; and environment information indicating an environment in which the corresponding image was photographed.

With this configuration, the image processing device can the collection of photographed images into one or more groups based on at least one of the time information, location information, human information, photo-taking information, and environment information.

(4) Optionally, the extracting unit may compute a similarity among the photographed images in the collection with respect to each of one or more of the information items to be used for the dividing and divide the photographed images into the one or more groups of similar images based on the thus computed similarity.

With this configuration, the image processing device can divide the collection of photographed images into one or more groups with reference to the similarities among the photographed images. This ensures that similar images are grouped into the same group.

(5) Optionally, the extracting unit may extract each photographic attribute by acquiring a piece of statistic information using at least one of the information items.

With this configuration, the image processing device can extract the statistic information as a photographic attribute.

(6) Optionally, the extracting unit may acquire a piece of statistic information for each group of images. The statistic information may be (i) family structure information indicating members of a family of a specific person when the specific person is identified from one or more pieces of human information provided for the images within the group or (ii) human object information indicating an age or sex distribution of people identified from one or more pieces of human information provided for the images within the group.

With this configuration, the image processing device can use family-structure information or human object information as the statistic information.

(7) Optionally, the family structure information or the human object information may include information indicating time-varying change of a human face or body.

With this configuration, the image processing device can add information indicating time-varying change of a human face or body into the family-structure information or human object information. Suppose, for example, that images are photographed at a specific annual event. With the provision of information indicating time-varying change, a person appearing in one image is more accurately identified as the same person appearing in another image. As a consequence, each occurrence of the event is collectively specified as one event rather than separate events.

(8) Optionally, each of the events may be associated with a plurality of objects. Each photographic attribute may be associated with a corresponding event by associating the photographic attribute with the objects predicted to appear in an image photographed in the event. The specifying unit may: compute, for each photographic attribute extracted by the extracting unit, a priority value of each object associated with the photographic attribute; specify a candidate event by selecting one of the events resulting in a largest sum of priority values computed for the respective objects associated with the event; and specify, from the objects associated with the candidate event, objects having a priority value equal to or higher than a predetermined value.

With this configuration, the image processing device selects potential objects with the use of their priority values. Thus, potential objects having a relatively high priority, i.e., potential objects expected to be more effective for image classification, are ensued to be used.

(9) Optionally, each photographic attribute may have a specific priority value assigned thereto. The specifying unit may add up the priority value assigned to each photographic attribute as the priority value of each object associated with the photographic attribute.

With this configuration, a priority value is assigned for each photographic attribute. Therefore, by assigning a higher priority to an object that is more important for image classification, the image processing device can predict objects appearing in the images at higher probability.

(10) Optionally, each of a plurality of groups of similar objects may have similarity information indentifying the group of similar objects, and the specifying unit may specify for each group of similar objects one object having a highest priority from among objects within the group and having a priority value equal to the predetermined value or more.

With this configuration, the image processing device is enabled to extract objects that are not similar to each other, so that the association of images with objects is carried out more accurately.

(11) The associating unit may judge whether or not further classification is necessary based on a result of previous classification of the photographed images according to the association by the associating unit. When the associating unit judges that further classification is necessary, the specifying unit may specify a group of objects excluding all objects used in the previous classification, a group including all of the objects used in the previous classification, or a group including some of the objects used in the previous classification.

With this configuration, the image processing device is enabled to recursively perform the association process according to the previous result of the association process. That is to say, the image processing device repeats the association process to obtain a more accurate association result.

(12) Optionally, the associating unit may judge that further classification is necessary when the number of images classified into one object is equal to a predetermined number or more, and the specifying unit may specify another event associated with the one object and selects one or more objects having a priority value equal to a predetermined value or more from among objects associated with the other event.

With this configuration, if images exceeding a predetermined number are classified into one object, the image processing device judges that the images are classified unevenly among objects and thus further performs a classification process to obtain a more accurate classification result.

(13) Optionally, each object may have a value assigned thereto according to a difficulty level of photographing the object, and the specifying unit may add up the value assigned according to the difficulty level as the priority value of each object associated with the photographic attribute.

With this configuration, the image processing device can extract photographic attributes according to the difficulty levels at which corresponding objects are photographed.

(14) Optionally, the image processing device may further include a partitioning unit that partitions each image in the collection into a plurality of regions according to visual content of the image prior to the extraction by the extracting unit.

The extracting unit may carry out the extraction of one or more photographic attributes on a region-by-region basis.

With this configuration, the image processing device can divide each image into a plurality of regions according to its visual content and extract photographic attributes on a region-by-region basis. This ensures that more appropriate photographic attributes are extracted.

(15) Optionally, the petitioning unit may partition each image into a human region in which a person is detected and a region other than the human region.

With this configuration, the image processing device partitions each image into a human region and a region other than the human region. This makes it possible to more appropriately extract photographic attributes relevant to a human object and photographic attributes relevant to another region, such as a background region.

(16) Optionally, the image processing device may further include: a receiving unit that receives from a user an instruction for extracting objects from a collection of images belonging to one event; and a registering unit. The registering unit extracts any object associated with the one event from the collection of images belonging to the one event upon receipt of the instruction; associates each extracted object with the one event to which the collection of images belong; and registers each extracted object into the object information storage unit, as being associated with the event.

With this configuration, the image processing device can perform the process of associating an object with an image, by using the events and potential objects registered by the user. This ensures that the classification is performed in a manner specifically suitable for the user.

(17) Optionally, the registering unit may extract photographic attributes from the collection of images and associate each of the extracted photographic attributes with the event to which the collection of images belong.

With this configuration, the image processing device can associate one or more photographic attributes extracted from the collection of images with the event to which the collection of images belong. Therefore, when subsequently performing the association process, the image processing device can specify an event in a manner more suitable for the user.

(18) Optionally, the image processing device may further include: an acquiring unit that acquires model information associated with the object specified by the specifying unit from an external device over a network, the model information composed of feature values of the object. The associating unit may judge, for each of the plurality of images, whether or not the object specified by the specification unit appears in the image, based on feature values of the image and the feature values shown by the model information.

With this configuration, the image classification device acquires model information regarding objects from an external device. This eliminates the need for the image classification device to store model information of all potential objects in advance. Therefore, the image classification device having this configuration is effective to save the storage capacity.

(19) Optionally, the image processing device may further include: an acquiring unit that acquires the collection of photographed images from an external device over a network.

With this configuration, the image classification device acquires the collection of images targeted for the classification from an external device. This eliminates the need for the image classification device to store target images in advance. Therefore, the image classification device having this configuration is effective to save the storage capacity.

(20) In another aspect of the present invention, an image processing system includes an image processing device, and a server device connected to the image processing device over a network. The image processing device includes: an attribute storage unit that stores a photographic attribute for each of a plurality of events, each photographic attribute indicating a photographic condition predicted to be met with respect to an image photographed in the corresponding event; an object information storage unit that stores, for each event, an object predicted to appear in an image photographed in the corresponding event; an extracting unit that extracts from a collection of photographed images a photographic attribute that is common among a predetermined number of photographed images in the collection, based on pieces of photography-related information of the respective photographed images; a specifying unit that specifies an object stored, in the object information storage unit, for an event corresponding to the extracted photographic attribute; an acquiring unit that acquires model information associated with the object specified by the specifying unit from the server device over the network, the model information composed of feature values of the specified object; and an associating unit that judges, for each of the plurality of images in the collection, whether or not the object specified by the specification unit appears in the image based on feature values of the image and the feature values shown by the model information, and associates each image judged to contain the specified object with the object. The server device includes: a model information storage unit that stores a piece of model information for each object to be stored in the object information storage unit, each piece of model information composed of feature values of the corresponding object; and a transmitting unit that transmits a piece of model information corresponding to the object specified by the specifying unit to the image processing device over the network.

With this configuration, the image processing device included in the image processing system performs a process for associating target images with objects after specifying potential objects that are likely to appear in images photographed at a specific event associated with the photographic attributes of the target images. This eliminates the need for the user to specify potential objects to be used for the association process, reducing the user's trouble required for the association process. In addition, the image processing device limits the potential objects to be used for the classification to those associated with the event that is in turn associated with the extracted photographic attribute. Consequently, the classification is ensured to be accurate. In addition, the image classification device acquires model information regarding objects from the server device. This eliminates the need for the image classification device to store model information of all potential objects in advance. Therefore, the image classification device having this configuration is effective to save the storage capacity.

(21) In another aspect of the present invention, an image processing system includes an image processing device, and a terminal device connected to the image processing device over a network. The terminal device includes: a storage unit that stores a collection of photographed images; and a transmitting unit that transmits the collection of photographed images to the image processing device over the network. The image processing device includes: an attribute storage unit that stores a photographic attribute for each of a plurality of events, each photographic attribute indicating a photographic condition predicted to be met with respect to an image photographed in the corresponding event; an object information storage unit that stores, for each event, an object predicted to appear in an image photographed in the corresponding event; an acquiring unit that acquires the collection of photographed images from the terminal device over the network; an extracting unit that extracts from the collection of photographed images a photographic attribute that is common among a predetermined number of photographed images in the collection, based on pieces of photography-related information of the respective photographed images; a specifying unit that specifies an object stored, in the object information storage unit, for an event corresponding to the extracted photographic attribute; and an associating unit that conducts a process on the collection of photographed images to associate each photographed image containing the specified object with the object.

With this configuration, the image processing device included in the image processing system performs a process for associating target images with objects after specifying potential objects that are likely to appear in images photographed at a specific event associated with the photographic attributes of the target images. This eliminates the need for the user to specify potential objects to be used for the association process, reducing the user's trouble required for the association process. In addition, the image processing device limits the potential objects to be used for the classification to those associated with the event that is in turn associated with the extracted photographic attribute. Consequently, the classification is ensured to be accurate. With this configuration, the image classification device acquires the collection of images targeted for the classification from the terminal device. This eliminates the need for the image classification device to store target images in advance. Therefore, the image classification device having this configuration is effective to save the storage capacity.

INDUSTRIAL APPLICABILITY

An image classification device according to the present invention is useful for accurately tagging an image collection composed of a large number of images. For example, for automatically organizing images or for retrieving a desired image, the image classification device can perform a process of associating images with objects in a manner suitable for the event to which the images in the user's local data belong. Therefore, images containing a specific object are extracted with efficiency. Furthermore, the possible applications of the image processing device according to the present invention include a DVD recorder, television receiver, personal computer, data server, and the like, which conducts image processing.

REFERENCE SIGNS LIST 1, 1000, 2000, 3000, 4100 image classification device (image processing device)
11 local data storage unit
12 image feature value computing unit
13 common attribute extracting unit
14, 1400, 2400 classifying unit
15, 1500, 3815, 4115 classification dictionary creating unit
16 classification model information storage unit
17 image attribute information storage unit
131 image information extracting unit
132 photo-unit extracting unit
133 common attribute judging unit
1800 core object extracting unit
2800 region information computing unit
3800 input unit
3801 registration unit
3815 classification dictionary creating unit 4000 image classification system
4110, 4512 transmitting and receiving unit
4116 event-related information storage unit
4150 receiving unit
4500 server device
4510 model information storage unit
4511, 4611 control unit
4600 terminal device
4610 local data storage unit
4612 transmitting unit

The invention claimed is:

1. An image processing device comprising:
a processor; and
a non-transitory memory having stored thereon executable instructions which, when executed, cause the processor to perform at least the following:
storing, in an attribute storage unit, a photographic attribute for each of a plurality of events, each photographic attribute indicating a photographic condition predicted to be met with respect to an image photographed in the corresponding event;
storing, in an object information storage unit, for each event, an object predicted to appear in an image photographed in the corresponding event;
extracting from a collection of photographed images a photographic attribute that is common among a predetermined number of photographed images in the collection, based on pieces of photography-related information of the respective photographed images;
specifying an object stored, in the object information storage unit, for an event corresponding to the extracted photographic attribute; and
conducting an associating process on the collection of photographed images to associate each photographed image containing the specified object with the object.

2. The image processing device according to claim 1, wherein
said extracting includes dividing the collection of photographed images into one or more groups based on the pieces of photography-related information of the respective photographed images and extracting one or more photographic attributes common among the photographed images within each group.

3. The image processing device according to claim 2, wherein
each piece of photography-related information includes at least one of the following information items:
time information indicating a time at which a corresponding image was photographed;
location information indicating a location at which the corresponding image was photographed;
human information regarding a person appearing in the corresponding image;
photo-taking information indicating a photographing method used to photograph the corresponding image; and
environment information indicating an environment in which the corresponding image was photographed.

4. The image processing device according to claim 3, wherein
said extracting includes computing a similarity among the photographed images in the collection with respect to each of one or more of the information items to be used for the dividing and divides the photographed images into the one or more groups of similar images based on the thus computed similarity.

5. The image processing device according to claim 3, wherein
said extracting includes extracting each photographic attribute by acquiring a piece of statistic information using at least one of the information items.

6. The image processing device according to claim 5, wherein
said extracting includes acquiring a piece of statistic information for each group of images, the statistic information being (i) family structure information indicating members of a family of a specific person when the specific person is identified from one or more pieces of human information provided for the images within the group or (ii) human object information indicating an age or sex distribution of people identified from one or more pieces of human information provided for the images within the group.

7. The image processing device according to claim 6, wherein
the family structure information or the human object information includes information indicating time-varying change of a human face or body.

8. The image processing device according to claim 2, wherein
each of the events is associated with a plurality of objects,
each photographic attribute is associated with a corresponding event by associating the photographic attribute with the objects predicted to appear in an image photographed in the event, and
said specifying includes:
computing, for each photographic attribute extracted by said extracting, a priority value of each object associated with the photographic attribute;
specifying a candidate event by selecting one of the events resulting in a largest sum of priority values computed for the respective objects associated with the event; and
specifying, from the objects associated with the candidate event, objects having a priority value equal to or higher than a predetermined value.

9. The image processing device according to claim 8, wherein
each photographic attribute has a specific priority value assigned thereto, and
said specifying includes adding up the priority value assigned to each photographic attribute as the priority value of each object associated with the photographic attribute.

10. The image processing device according to claim 8, wherein
each of a plurality of groups of similar objects has similarity information identifying the group of similar objects, and
said specifying includes specifying for each group of similar objects one object having a highest priority from among objects within the group and having a priority value equal to the predetermined value or more.

11. The image processing device according to claim 8, wherein
said associating process includes judging whether or not further classification is necessary based on a result of previous classification of the photographed images according to the association by said associating process, and said specifying includes, when said associating process judges that further classification is necessary, specifying a group of objects excluding all objects used in the previous classification, a group including all of the objects used in the previous classification, or a group including some of the objects used in the previous classification.

12. The image processing device according to claim 11, wherein
said associating process includes judging that further classification is necessary when the number of images classified into one object is equal to a predetermined number or more, and
said specifying includes specifying another event associated with the one object and selecting one or more objects having a priority value equal to a predetermined value or more from among objects associated with the other event.

13. The image processing device according to claim 8, wherein
each object has a value assigned thereto according to a difficulty level of photographing the object, and
said specifying includes adding up the value assigned according to the difficulty level as the priority value of each object associated with the photographic attribute.

14. The image processing device according to claim 1, wherein the executable instructions on the non-transitory storage medium, when executed, further cause the processor to perform at least the following:
partitioning each image in the collection into a plurality of regions according to visual content of the image prior to said extracting, wherein
said extracting includes carrying out the extraction of one or more photographic attributes on a region-by-region basis.

15. The image processing device according to claim 14, wherein
said partitioning includes partitioning each image into a human region in which a person is detected and a region other than the human region.

16. The image processing device according to claim 1, wherein the executable instructions on the non-transitory storage medium, when executed, further cause the processor to perform at least the following:
receiving from a user an instruction for extracting objects from a collection of images belonging to one event; and
registering extracted objects, including:
extracting any object associated with the one event from the collection of images belonging to the one event upon receipt of the instruction;
associating each extracted object with the one event to which the collection of images belong; and
registering each extracted object into the object information storage unit, as being associated with the event.

17. The image processing device according to claim 16, wherein
said registering extracted objects further includes extracting photographic attributes from the collection of images and associating each of the extracted photographic attributes with the event to which the collection of images belong.

18. The image processing device according to claim 1, wherein the executable instructions on the non-transitory storage medium, when executed, further cause the processor to perform at least the following:
acquiring model information associated with the object specified by said specifying from an external device over a network, the model information being composed of feature values of the object, wherein said associating process includes judging, for each of the plurality of images, whether or not the object specified by the specification unit appears in the image, based on feature values of the image and the feature values shown by the model information.

19. The image processing device according to claim 1, wherein the executable instructions on the non-transitory storage medium, when executed, further cause the processor to perform at least the following:
acquiring the collection of photographed images from an external device over a network.

20. A processing method used by an image processing device having: an attribute storage unit that stores a photographic attribute for each of a plurality of events, each photographic attribute indicating a photographic condition predicted to be met with respect to an image photographed in the corresponding event; an object information storage unit that stores, for each event, an object predicted to appear in an image photographed in the corresponding event; an extracting unit; a specifying unit; and an associating unit,
the processing method comprising:
an extracting step performed by the extracting unit to extract from a collection of photographed images a photographic attribute that is common among a predetermined number of photographed images in the collection, based on pieces of photography-related information of the respective photographed images;
a specifying step performed by the specifying unit to specify an object stored, in the object information storage unit, for an event corresponding to the extracted photographic attribute; and
an associating step performed by the associating unit to conduct a process on the collection of photographed images to associate each photographed image containing the specified object with the object.

21. A non-transitory computer readable storage medium having stored thereon a computer program run by an image processing device having: an attribute storage unit that stores a photographic attribute for each of a plurality of events, each photographic attribute indicating a photographic condition predicted to be met with respect to an image photographed in the corresponding event; an object information storage unit that stores, for each event, an object predicted to appear in an image photographed in the corresponding event; an extracting unit; a specifying unit; and an associating unit,
the program comprising code operable to cause:
an extracting step to be performed by the extracting unit to extract from a collection of photographed images a photographic attribute that is common among a predetermined number of photographed images in the collection, based on pieces of photography-related information of the respective photographed images;
a specifying step to be performed by the specifying unit to specify an object stored, in the object information storage unit, for an event corresponding to the extracted photographic attribute; and
an associating step to be performed by the associating unit to conduct a process on the collection of photographed images to associate each photographed image containing the specified object with the object.

22. An image processing system including an image processing device, and a server device connected to the image processing device over a network,
the image processing device comprising:
a processor; and
a non-transitory memory having stored thereon executable instructions which, when executed, cause the processor to perform at least the following:
storing, in an attribute storage unit, a photographic attribute for each of a plurality of events, each photographic attribute indicating a photographic condition predicted to be met with respect to an image photographed in the corresponding event;
storing, in an object information storage unit, for each event, an object predicted to appear in an image photographed in the corresponding event;
extracting from a collection of photographed images a photographic attribute that is common among a predetermined number of photographed images in the collection, based on pieces of photography-related information of the respective photographed images;
specifying an object stored, in the object information storage unit, for an event corresponding to the extracted photographic attribute;
acquiring model information associated with the object specified by said specifying from the server device over the network, the model information composed of feature values of the specified object; and
judging, for each of the plurality of images in the collection, whether or not the object specified by the specification unit appears in the image based on feature values of the image and the feature values shown by the model information, and associating each image judged to contain the specified object with the object, and
the server device comprising:
a server processor; and
a server non-transitory memory having stored thereon executable instructions which, when executed, cause the server processor to perform at least the following:
storing, in a model information storage unit, a piece of model information for each object to be stored in the object information storage unit, each piece of model information composed of feature values of the corresponding object; and
transmitting a piece of model information corresponding to the object specified by the specifying unit to the image processing device over the network.

23. An image processing system including an image processing device, and a terminal device connected to the image processing device over a network,
the terminal device comprising:
a processor; and
a non-transitory memory having stored thereon executable instructions which, when executed, cause the processor to perform at least the following:
storing, on a storage unit, a collection of photographed images; and
transmitting the collection of photographed images to the image processing device over the network, and
the image processing device comprising:
an image processing device processor; and
an image processing device non-transitory memory having stored thereon executable instructions which, when executed, cause the image processing device processor to perform at least the following:
storing, in an attribute storage unit, a photographic attribute for each of a plurality of events, each photographic attribute indicating a photographic condition predicted to be met with respect to an image photographed in the corresponding event;

storing, in an object information storage unit, for each event, an object predicted to appear in an image photographed in the corresponding event;

acquiring the collection of photographed images from the terminal device over the network;

extracting from the collection of photographed images a photographic attribute that is common among a predetermined number of photographed images in the collection, based on pieces of photography-related information of the respective photographed images;

specifying an object stored, in the object information storage unit, for an event corresponding to the extracted photographic attribute; and conducting an associating process on the collection of photographed images to associate each photographed image containing the specified object with the object.

* * * * *